(12) United States Patent
Yasukawa et al.

(10) Patent No.: US 11,690,078 B2
(45) Date of Patent: Jun. 27, 2023

(54) TERMINAL, RADIO COMMUNICATION SYSTEM, AND COMMUNICATION METHOD

(71) Applicant: NTT DOCOMO, INC., Tokyo (JP)

(72) Inventors: Shimpei Yasukawa, Tokyo (JP); Satoshi Nagata, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 36 days.

(21) Appl. No.: 17/457,173

(22) Filed: Dec. 1, 2021

(65) Prior Publication Data

US 2022/0095285 A1 Mar. 24, 2022

Related U.S. Application Data

(63) Continuation of application No. 16/737,617, filed on Jan. 8, 2020, now abandoned, which is a continuation
(Continued)

(30) Foreign Application Priority Data

Sep. 1, 2015 (JP) .............................. JP2015-172392

(51) Int. Cl.
*H04W 72/23* (2023.01)
*H04W 28/06* (2009.01)
(Continued)

(52) U.S. Cl.
CPC ............ *H04W 72/23* (2023.01); *H04L 5/0048* (2013.01); *H04W 28/06* (2013.01); *H04W 72/04* (2013.01); *H04W 92/18* (2013.01); *Y02D 30/70* (2020.08)

(58) Field of Classification Search
CPC ..... H04W 72/23; H04W 28/06; H04W 72/04; H04W 92/18; H04L 5/0048; Y02D 30/70
See application file for complete search history.

(56) References Cited

U.S. PATENT DOCUMENTS

2011/0200004 A1* 8/2011 Nakashima ......... H04J 13/0062
370/329
2014/0226639 A1* 8/2014 Yi ........................ H04W 8/005
370/336
(Continued)

FOREIGN PATENT DOCUMENTS

CN 104796845 A 7/2015
JP 2015-008404 A 1/2015
(Continued)

OTHER PUBLICATIONS

International Search Report issued in PCT/JP2016/074253 dated Nov. 1, 2016 (5 pages).
(Continued)

*Primary Examiner* — Ajay Cattungal
(74) *Attorney, Agent, or Firm* — Osha Bergman Watanabe & Burton LLP

(57) ABSTRACT

A terminal is disclosed including a receiver configured to receive first sidelink control information (SCI) in a first physical sidelink control channel (PSCCH) from another terminal; a processor configured to measure a reception level based on the first PSCCH and determine whether a radio resource for sidelink transmission is usable based on the reception level; and a transmitter configured to transmit data via a physical sidelink shared channel (PSSCH) within the radio resource, wherein the processor is configured to determine to not use the radio resource for transmission when the reception level of the first PSCCH is higher than a threshold. In other aspects, a radio communication system and a communication method are also disclosed.

14 Claims, 22 Drawing Sheets

Related U.S. Application Data of application No. 15/755,256, filed as application No. PCT/JP2016/074253 on Aug. 19, 2016, now Pat. No. 10,568,084.

(51) Int. Cl.
  *H04W 72/04* (2023.01)
  *H04W 92/18* (2009.01)
  *H04L 5/00* (2006.01)

(56) References Cited

U.S. PATENT DOCUMENTS

| | | | |
|---|---|---|---|
| 2016/0345297 A1 | 11/2016 | Chen et al. | |
| 2018/0063820 A1* | 3/2018 | Xiong | H04W 72/23 |
| 2018/0084480 A1* | 3/2018 | Yasukawa | H04W 88/04 |
| 2018/0098337 A1* | 4/2018 | Lee | H04W 72/12 |
| 2018/0139014 A1* | 5/2018 | Xiong | H04W 72/0453 |
| 2018/0248662 A1* | 8/2018 | Kim | H04L 5/0007 |

FOREIGN PATENT DOCUMENTS

| | | |
|---|---|---|
| WO | 2014/129451 A1 | 8/2014 |
| WO | 2015/021185 A1 | 2/2015 |
| WO | 2015/115505 A1 | 8/2015 |

OTHER PUBLICATIONS

Written Opinion of the International Searching Authority issued in PCT/JP2016/074253 dated Nov. 1, 2016 (4 pages).
"Key drivers for LTE success: Services Evolution," Sep. 2011, 3GPP, Internet URL: http://www.3gpp.org/ftp/Information/presentations/presentations_2011/2011_09_LTE_Asia/2011_LTE-Asia_3GPP_Service_evolution.pdf (15 pages).
Samsung; "Control information needed for D2D broadcast communication"; 3GPP TSG RAN WG1 Meeting #78, R1-143076; Dresden, Germany; Aug. 18-22, 2014 (8 pages).
Partial Supplementary European Search Report issued in the counterpart European Patent Application No. 16841541.2, dated Feb. 20, 2019 (14 pages).
Huawei, HiSilicon; "Physical channel design for D2D"; 3GPP TSG RAN WG1 Meeting #74bis R1-134354; Guangzhou, China, Oct. 7-11, 2013 (4 pages).
Sanchez Moya, Fernando, et al.; "D2D Mode Selection and Resource Allocation with Flexible UL/DL TDD for 5G Deployments"; 2015 IEEE International Conference on Communication Workshop (ICCW), IEEE; Jun. 8, 2015, pp. 657-663, XP033202815 (7 pages).
Office Action issued in Japanese Application No. 2017-537745; dated Mar. 31, 2020 (6 pages).
Extended European Search Report issued in European Application No. 21160435.0, dated Jun. 30, 2021 (9 pages).
Office Action issued in counterpart Chinese Application No. 201680047648.1 dated Aug. 4, 2021 (16 pages).
Office Action in counterpart Japanese Patent Application No. 2020-178991 dated Dec. 21, 2021 (5 pages).
Alcatel-Lucent Shanghai Bell et al; "Support for PC5 priority"; 3GPP TSG RAN WG1 Meeting #82, R1-154599; Beijing, China; Aug. 24-28, 2015 (3 pages).
Qualcomm Incorporated; "V2V Performance Initial Evaluation Results"; 3GPP TSG-RAN WG1 #82, R1-153895; Beijing, China; Aug. 24-28, 2015 (7 pages).

\* cited by examiner

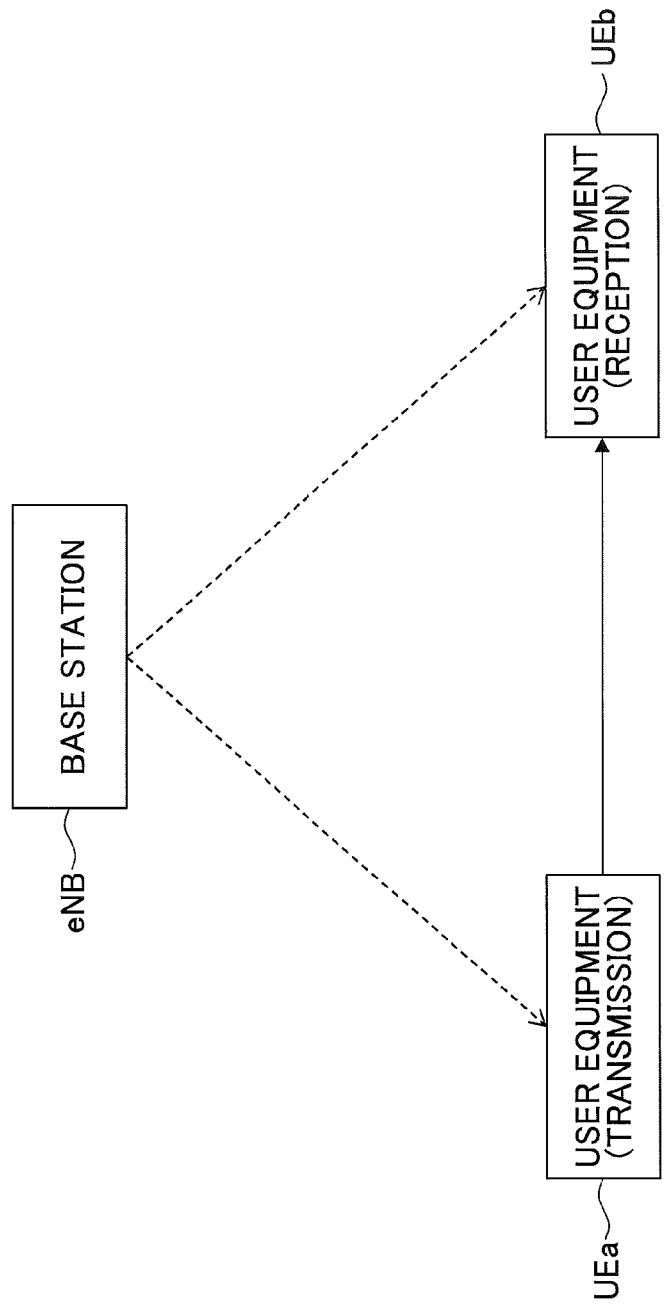

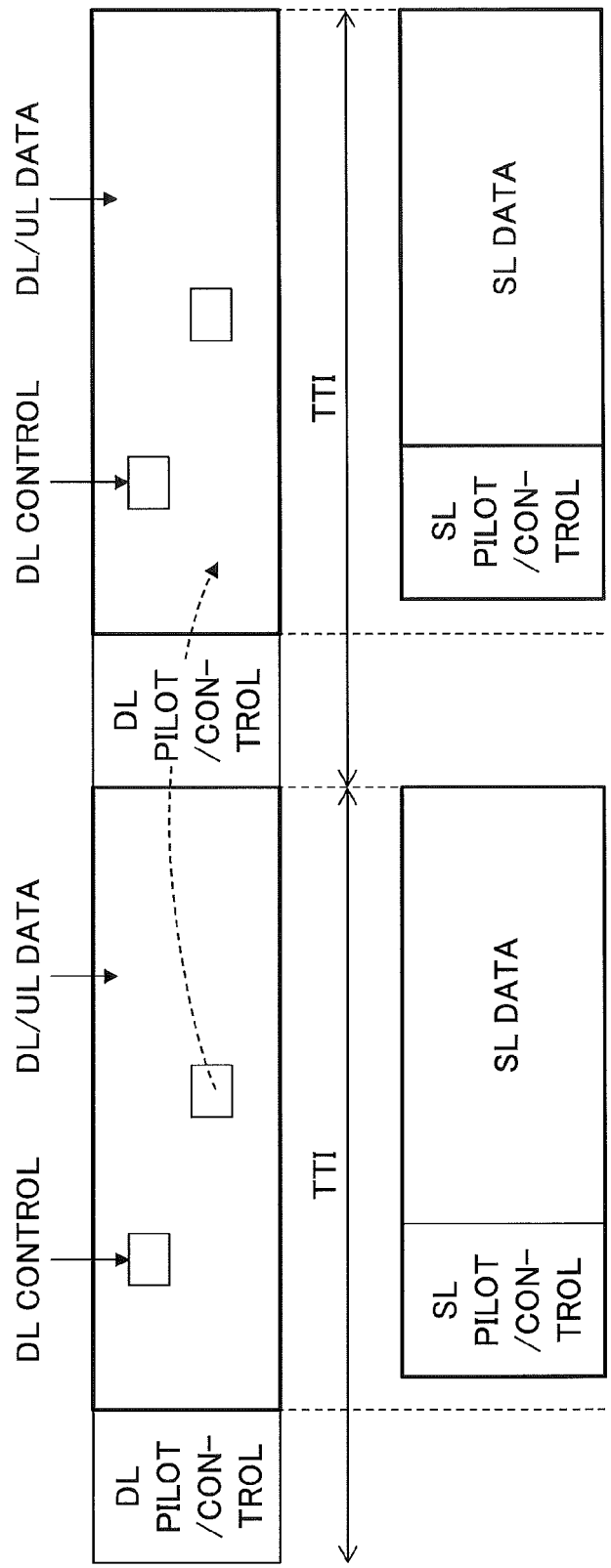

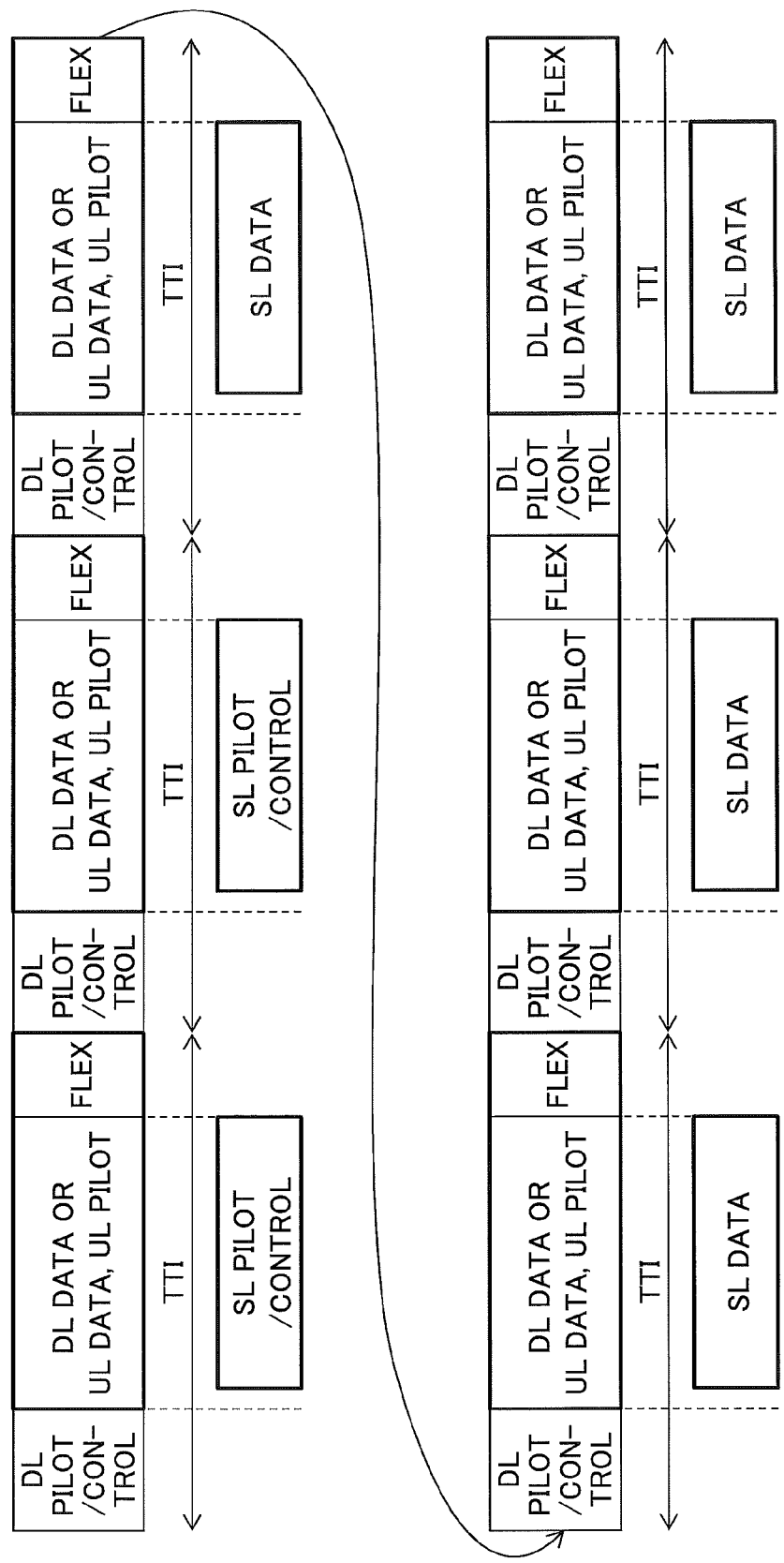

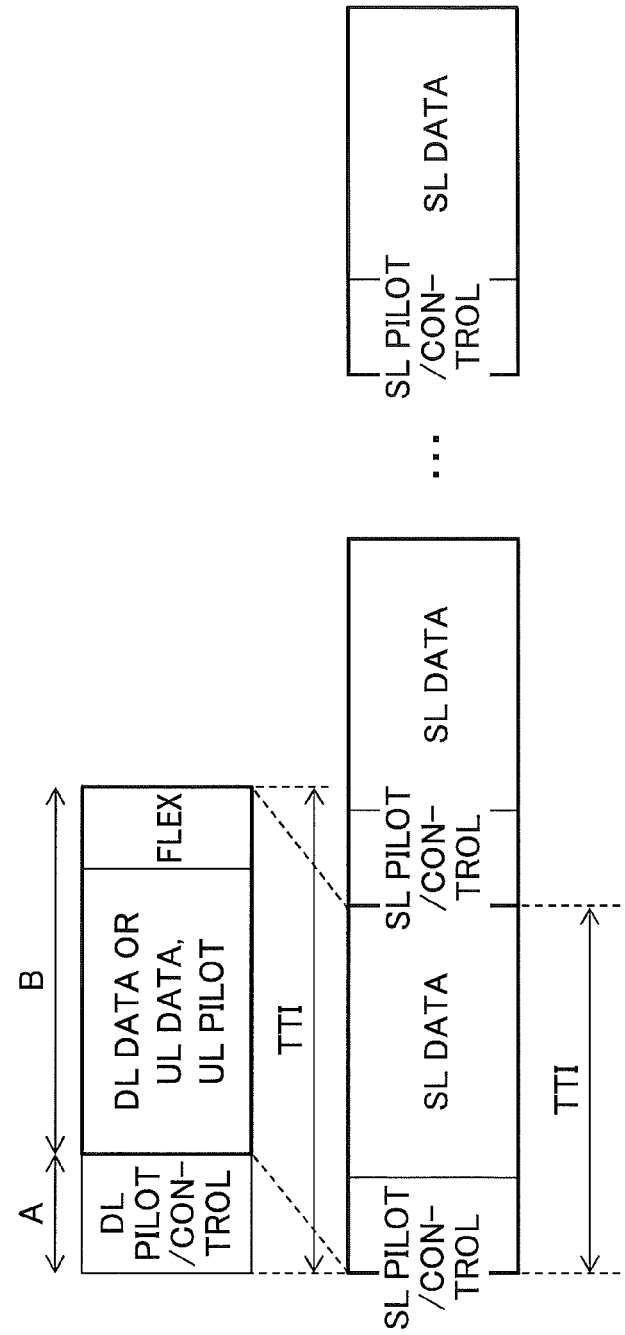

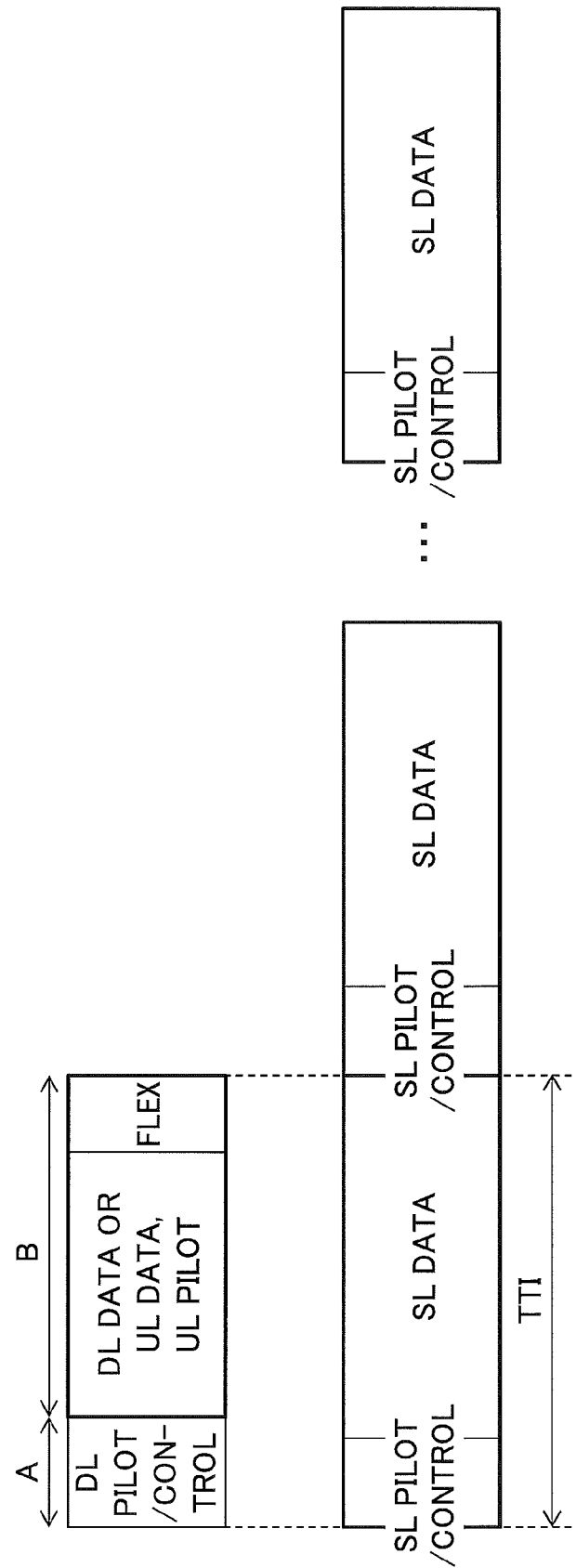

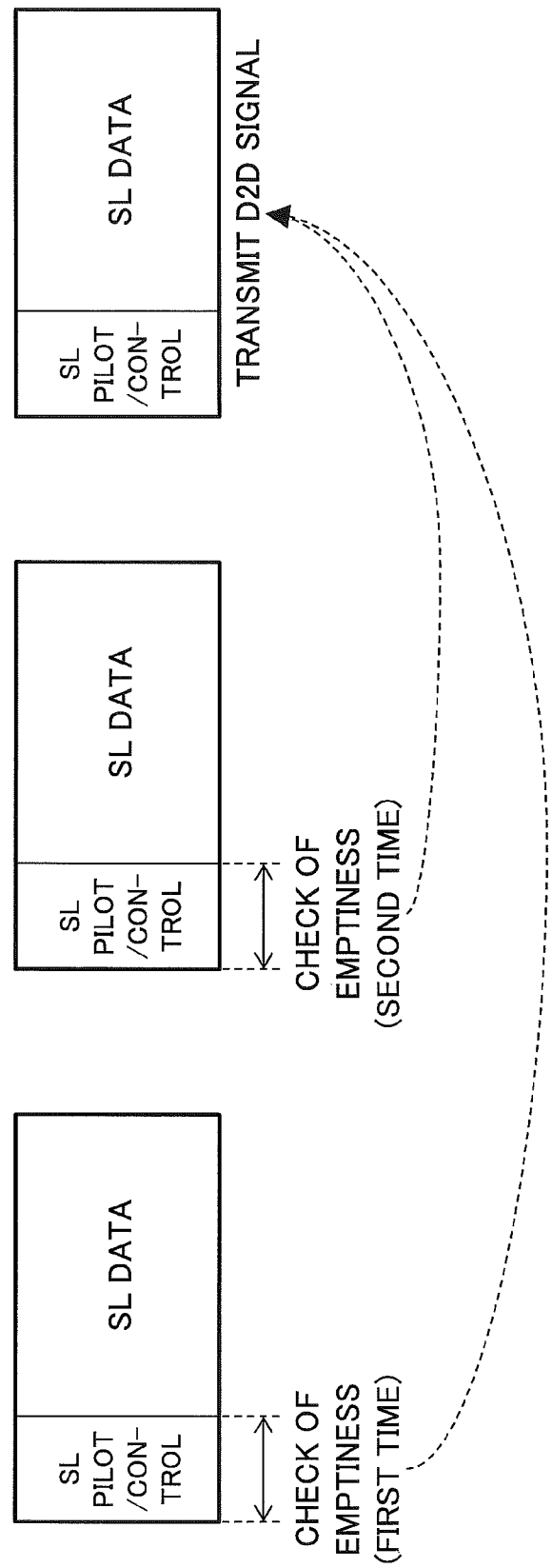

TERMINAL, RADIO COMMUNICATION SYSTEM, AND COMMUNICATION METHOD

CROSS-REFERENCE TO RELATED APPLICATIONS

The present application is a continuation application and, thereby, claims benefit under 35 U.S.C. § 120 to U.S. application Ser. No. 16/737,617, filed on Jan. 8, 2020, which is a continuation of U.S. application Ser. No. 15/755,256, filed on Feb. 26, 2018, which is a U.S. National Stage Application of PCT Application No. PCT/JP2016/074253, filed on Aug. 19, 2016, which claims priority to Japanese Patent Application No. 2015-172392, filed on Sep. 1, 2015. The contents of the priority applications are incorporated by reference in their entirety.

TECHNICAL FIELD

The present invention relates to a terminal, a radio communication system, and a communication method.

BACKGROUND ART

In a long term evolution (LTE) system or a system successive to the LTE system (also referred to as, for example, LTE-advanced (LTE-A), future radio access (FRA), or 4G), Device to Device (D2D) technology allowing user terminals to directly communicate with each other without using a radio base station has been studied (for example, see Non-Patent Document 1).

The D2D technology can reduce traffic between a user equipment and a base station and enable communication between user equipments even when a base station becomes incommunicable at the time of disaster or the like.

The D2D technology is roughly classified into D2D discovery (also referred to as D2D detection) for discovering another user terminal which is communicable and D2D communication (also referred to as D2D direct communication, direct communication between terminals) for allowing terminals to directly communicate with each other. Hereinafter, when the D2D communication and the D2D discovery are not to be particularly distinguished, the D2D communication and the D2D discovery are simply referred to as D2D. A signal which is transmitted and received by D2D is referred to as a D2D signal.

RELATED-ART DOCUMENT

Non-Patent Document

[Non-Patent Document 1] "Key drivers for LTE success: Services Evolution", September, 2011, 3GPP, Internet URL: http://www.3gpp.org/ftp/Information/presentations/presentations_2011/2011_09_LTE_Asia/2011_LTE-Asia_3GPP_Service_evolution.pdf

SUMMARY OF THE INVENTION

Problem to be Solved by the Invention

In 3rd Generation Partnership Project (3GPP), realization of V2X has been studied by using a D2D function. Here, V2X is a generic term of vehicle to vehicle (V2V) referring to a communication scheme which is performed between vehicles, vehicle to infrastructure (V2I: communication between road and vehicle) referring to a communication scheme which is performed between a vehicle and a roadside unit installed at a roadside, vehicle to Nomadic device (V2N: communication between device and vehicle) referring to a communication scheme which is performed between a vehicle and a mobile device of a driver, and vehicle to pedestrian (V2P: communication between pedestrian and vehicle) referring to a communication scheme which is performed between a vehicle and a mobile device of a pedestrian. In V2X, it is assumed that important communication (for example, communication for accident prevention, congestion avoidance, and the like) is handled, and thus there is demand for a more decrease in delay than in convention D2D.

In 3GPP, fifth-generation (5G) radio technology which is a next-generation radio communication system has been studied. An example of requirements proposed in 5G is achievement of a more decrease in delay in radio sections. In the D2D technology, demand for a decrease in delay in consideration of requirements of 5G is assumed.

In this way, there is demand for a more decrease in delay in D2D communication with enlargement in use form and advancement in radio technology, but in the current D2D technology, there is a large delay because a control signal and a data signal are periodically transmitted at a relatively long interval (40 ms).

A technology disclosed herein is made in consideration of the above-mentioned circumstances and an object thereof is to provide a technology that enables D2D communication with a low delay.

Means for Solving the Problems

The disclosed technology provides a user equipment in a radio communication system that supports D2D communication. The user equipment includes a determination unit that receives a first region in a radio frame, which is commonly used for downlink communication and uplink communication with a base station and includes the first region to which a downlink pilot signal and a downlink control signal are to be mapped and a second region to which downlink user data or uplink data is to be mapped, to determine whether a D2D signal is transmittable using the second region; and a transmission unit that transmits the D2D signal using the second region in the radio frame where a D2D physical control channel and a D2D physical data channel are time-multiplexed when the determination unit determines that the D2D signal is transmittable.

The disclosed technology also provides a user equipment in a radio communication system that supports D2D communication. The user equipment includes an acquisition unit that acquires carrier information indicating whether each of multiple carriers allocated to the radio communication system is used commonly for communication between a base station and the user equipment and D2D communication or used only for the D2D communication; and a transmission unit that when a D2D signal is to be transmitted using a carrier used only for the D2D communication, transmits the D2D signal using a radio frame where a D2D physical control channel and a D2D physical data channel are time-multiplexed.

Advantageous Effect of the Invention

According to the disclosed technology, it is possible to provide a technology that enables D2D communication with a low delay.

BRIEF DESCRIPTION OF THE DRAWINGS

FIG. 1 is a diagram illustrating an example of a configuration of a radio communication system according to an embodiment;

FIG. 6B is a diagram illustrating D2D physical 2' channel configuration (1-4) according to the embodiment;

FIG. 7 is a diagram illustrating D2D physical channel configuration (1-5) according to the embodiment;

FIG. 9A is a diagram illustrating D2D physical channel configuration (2) according to the embodiment;

FIG. 9B is a diagram illustrating D2D physical channel configuration (2) according to the embodiment;

FIG. 12 is a diagram illustrating a method of transmitting a D2D signal after checking an emptiness state of D2D radio resources;

DESCRIPTION OF EMBODIMENTS

Figure 2A:
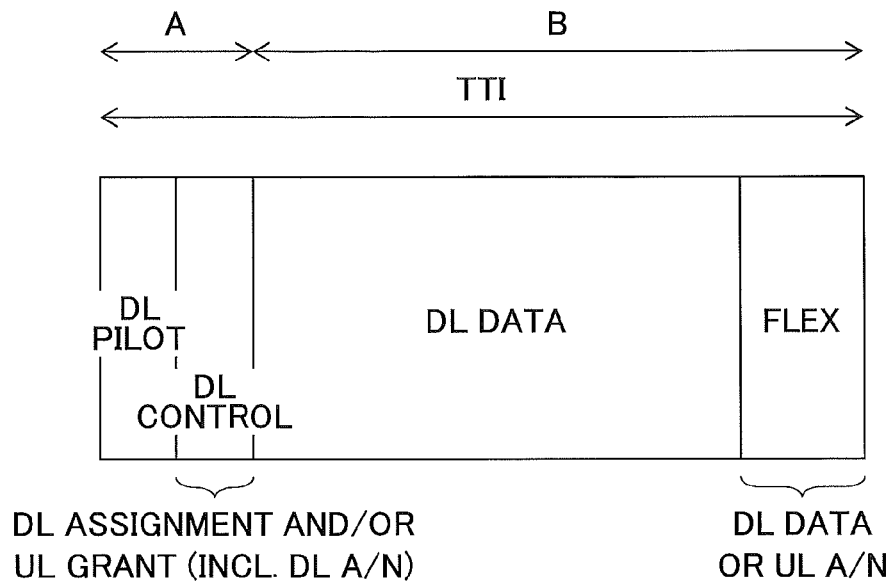
FIG. 2A is a diagram illustrating an example of a physical channel configuration which is studied in 5G.

Hereinafter, embodiments of the invention will be described with reference to the accompanying drawings. The embodiments described below are only examples and embodiments of the invention are not limited to the following embodiments. For example, a radio communication system according to the embodiments is assumed to be a LTE-based system, but the invention is not limited to the LTE and can be applied to another scheme. In the specification and the appended claims, "LTE" is used in a wide meaning including fifth-generation communication schemes corresponding to Releases 10, 11, 12, 13, and 14 of 3GPP and releases subsequent thereto as well as communication schemes corresponding to Releases 8 and 9 of 3GPP.

The following embodiment is described with the premise of a physical channel configuration which is studied in 5G, but application of the embodiment to only 5G is not intended. All or a part of the embodiment can be applied to various radio communication systems.

In the following description, one TTI is used to have a minimum unit of scheduling. One subframe is assumed to have the same length as one TTI and may be replaced with another term. A pilot signal is used to have the same meaning as a reference signal.

<<System Configuration>>

FIG. 1 is a diagram illustrating an example of a configuration of a radio communication system according to an embodiment. As illustrated in FIG. 1, a radio communication system according to this embodiment includes a base station eNB, a transmission-side user equipment UEa, and a reception-side user equipment UEb. In FIG. 1, the transmission-side user equipment UEa and the reception-side user equipment UEb are separately illustrated, but the transmission-side user equipment UEa and the reception-side user equipment UEb have the same D2D communication function (a function of transmitting and receiving a D2D signal). In the following description, any user equipment of the user equipment UEa and the user equipment UEb is referred to as a "user equipment UE."

The user equipment UE has a cellular communication function and a D2D communication function. The base station eNB has a function of performing various instructions (such as allocation of D2D resources) required for transmitting and receiving a D2D signal to the user equipment UE, for example, using broadcast information (system information such as SIB), radio resource control (RRC) signaling, or the like.

<<D2D Physical Channel Configuration>>

A D2D physical channel configuration which is used by the user equipment UE according to this embodiment to perform D2D communication will be described below. It is assumed that D2D physical channel configuration (1) to be described below is mainly used to perform an operation of overlapping 5G radio resources and D2D radio sources and D2D physical channel configuration (2) is mainly used to perform an operation when it is not necessary to consider interference with 5G radio resources, like a D2D dedicated carrier.

<5G Physical Channel Configuration>

A physical channel configuration which is studied in 5G will be first described below before describing a physical channel configuration which is used for D2D communication.

Figure 2B:
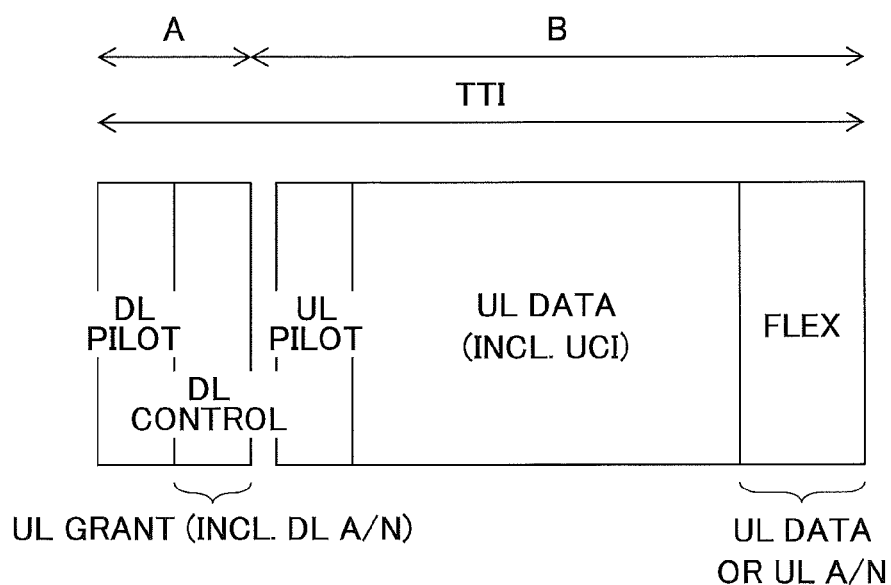
FIG. 2B is a diagram illustrating an example of a physical channel configuration which is studied in 5G.

FIGS. 2A and 2B are diagrams illustrating an example of a physical channel configuration which is studied in 5G. As illustrated in FIGS. 2A and 2B, it is proposed that a radio frame which is used for 5G between the base station eNB and the user equipment UE includes a region (Region "A" in FIGS. 2A and 2B) to which a pilot signal and a downlink control signal are mapped and a region (Region "B" in FIGS. 2A and 2B) to which data is mainly mapped in one TTI.

Region "A" is additionally partitioned into a pilot signal region (DL pilot) to which a downlink pilot signal is mapped and a control signal region (DL control) to which a downlink control signal is mapped. The downlink control signal mapped on the control signal region is, for example, a signal including scheduling information and/or various control signals such as a UL grant, like downlink control information (DCI). The control signal includes use information indicating a use of multi-use region to be described later.

Region "B" is partitioned into a data region to which DL data or UL data is mapped and a multi-use region (Flex). In 5G, application of dynamic time division duplex (TDD) of dynamically switching uplink and downlink in the unit of TTI is studied and arbitrary switching between use of the data region and the multi-use region for transmission of DL data or transmission of UL data using the downlink control signal which is mapped on the control signal region is studied. For example, a use method of mapping DL data on the data region when DL scheduling information (DL assignment) is included in the downlink control signal and mapping UL data on the data region when UL scheduling information (UL grant) is included in the downlink control signal is studied.

The multi-use region may be used in a part of the data region or may be used to transmit ACK/NACK (A/N) in response to DL data. The multi-used region may be used for transmission of an additional pilot signal and a guard period.

FIG. 2A illustrates an example of a physical channel configuration in which DL data is mapped on the data region, and FIG. 2B illustrates an example of a physical channel configuration in which UL data is mapped on the data region. When UL data is mapped on the data region, it is studied that an uplink pilot signal (UL pilot) is mapped on the head of the data region as illustrated in FIG. 2B. UL data may include uplink control information (UCI).

As for TDM of a plurality of signals (channels), various sequences or combination are considered and the invention is not limited to the sequence or combination illustrated in FIGS. 2A and 2B.

The vertical axis in FIGS. 2A and 2B represents a frequency axis and is not limited to a whole band, but may be a part of a band. This is because it is also studied in 5G that a whole band is divided into a plurality of sub bands and a radio frames having different TTI lengths are frequency-multiplexed (FDM). When the dynamic TDD is applied, switching of uplink/downlink in the unit of a whole band or sub bands is assumed.

<D2D Physical Channel Configuration (1)>

Subsequently, a plurality of examples of the configuration of D2D physical channel configuration (1) will be described below. In the following description, "D2D physical channel configuration (1)" is used in a meaning including D2D physical channel configurations (1-1) to (1-5).

(D2D Physical Channel Configuration (1-1))

Figure 3A:
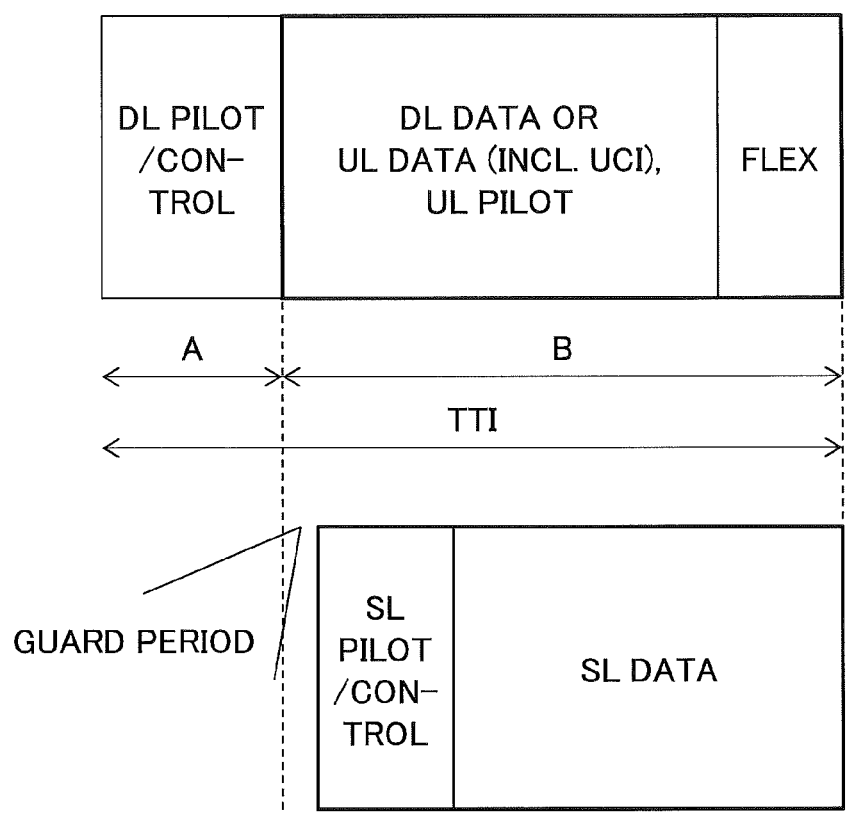
FIG. 3A is a diagram illustrating D2D physical channel configuration (1-1) according to the embodiment.
Figure 3B:
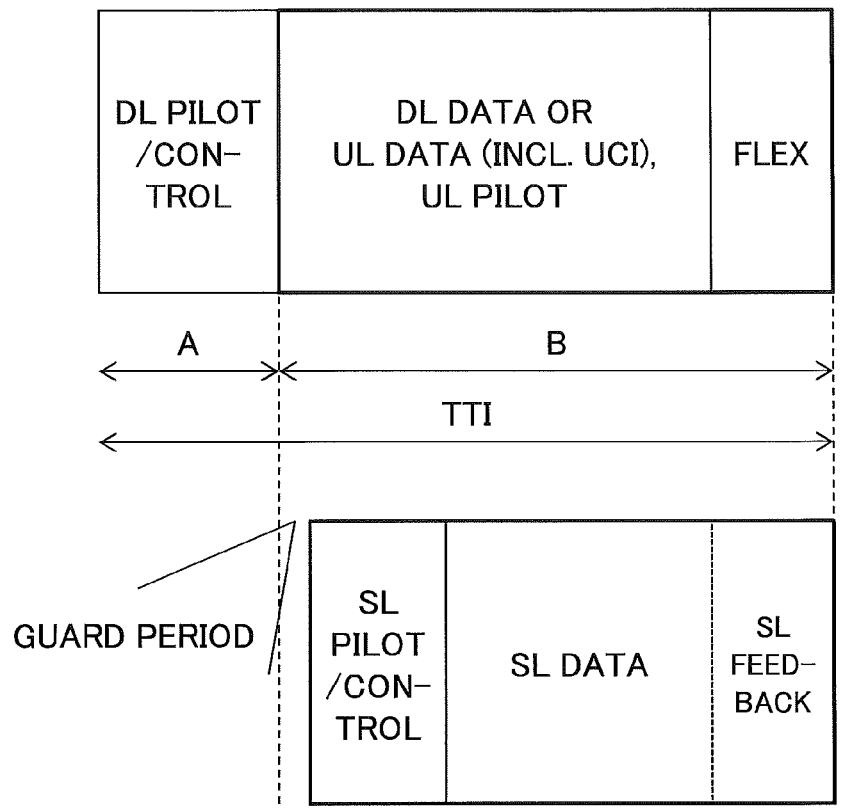
FIG. 3B is a diagram illustrating D2D physical channel configuration (1-1) according to the embodiment.
Figure 3C:
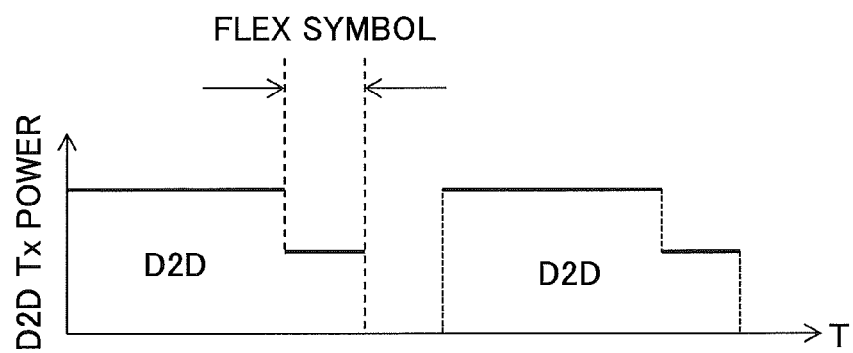
FIG. 3C is a diagram illustrating D2D physical channel configuration (1-1) according to the embodiment.

FIGS. 3A, 3B, and 3C are diagrams illustrating D2D physical channel configuration (1-1) in the embodiment. As illustrated in FIGS. 3A, 3B, and 3C, in this embodiment, a physical channel configuration in which a D2D pilot signal (side link (SL) pilot) channel and a D2D control signal (SL control) channel are mapped on first-half symbols among symbols corresponding to Region "B" of a 5G physical channel configuration and a D2D data (SL data) channel is mapped on second-half symbols may be used. Among symbols corresponding to Region "B" of the 5G physical channel configuration, one or more symbols of the head may be set as a guard period, or a guard period may not be particularly set. FIGS. 3A, 3B, and 3C illustrate an example of a physical channel configuration when one or more symbols of the head are set as a guard period.

A physical channel configuration not including a guard period may be described in the D2D physical channel configuration to be described below, but does not intend that a guard period is not included unless otherwise specified. A guard period may or may not be set in D2D physical channel configurations to be described below.

As illustrated in FIG. 3B, a feedback channel (SL feedback) for feedback from the reception-side user equipment UEb to the transmission-side user equipment UEa may be additionally mapped on second-half symbols. Regarding the feedback, it is assumed that ACK/NACK for HARQ of D2D data is fed back from the reception-side user equipment UEb to the transmission-side user equipment UEa.

The number of symbols to which the feedback channel is mapped may be equal to or different from the number of symbols of the multi-use region.

As illustrated in FIG. 3C, the user equipment UE may set transmission power in symbols corresponding to the multi-use region to be low. The transmission power may be designated by an offset value (an offset value from transmission power symbols other than the multi-use region) predetermined or broadcasted using broadcast information or may be designated by a transmission power parameter indicating transmission power in the symbols corresponding to the multi-use region.

(D2D Physical Channel Configuration (1-2))

Figure 4A:
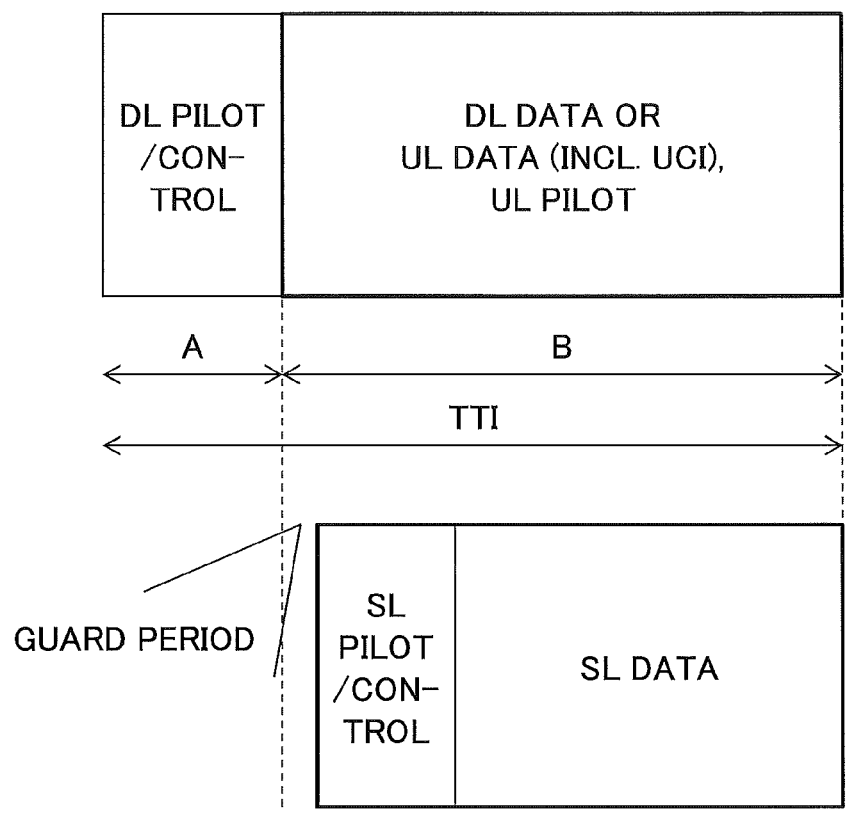
FIG. 4A is a diagram illustrating D2D physical channel configuration (1-2) according to the embodiment.
Figure 4B:
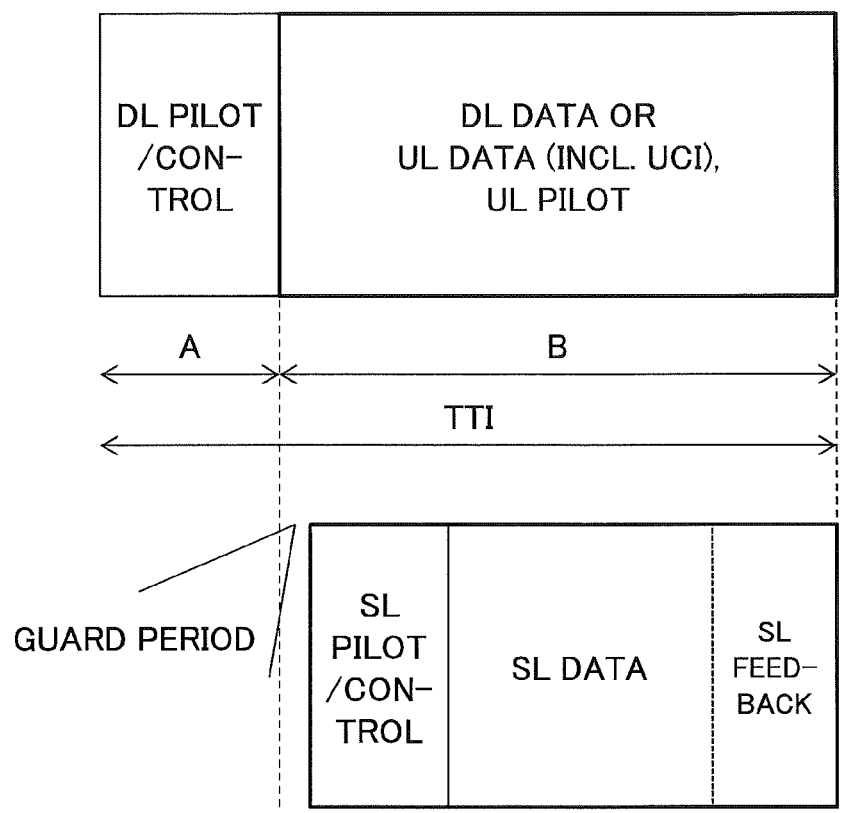
FIG. 4B is a diagram illustrating D2D physical channel configuration (1-2) according to the embodiment.

FIGS. 4A and 4B are diagrams illustrating D2D physical channel configuration (1-2) in the embodiment. Unlike FIGS. 3A, 3B, and 3C, FIGS. 4A and 4B illustrate a D2D physical channel configuration corresponding to a 5G physical channel configuration not including a multi-use region in Region "B." In D2D physical channel configuration (1-2), similarly to D2D physical channel configuration (1-1), a D2D pilot signal channel and a D2D physical control channel are mapped on first-half symbols among symbols corresponding to Region "B" of the 5G physical channel configuration and a D2D data (SL data) channel is mapped on second-half symbols.

(D2D Physical Channel Configuration (1-3))

Figure 5A:
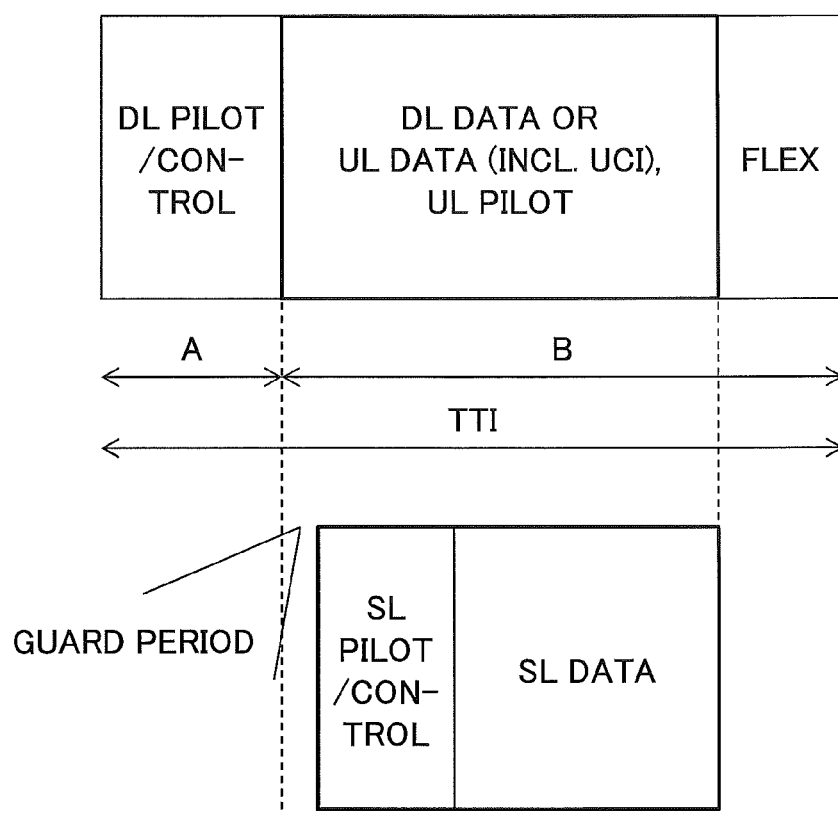
FIG. 5A is a diagram illustrating D2D physical channel configuration (1-3) according to the embodiment.
Figure 5B:
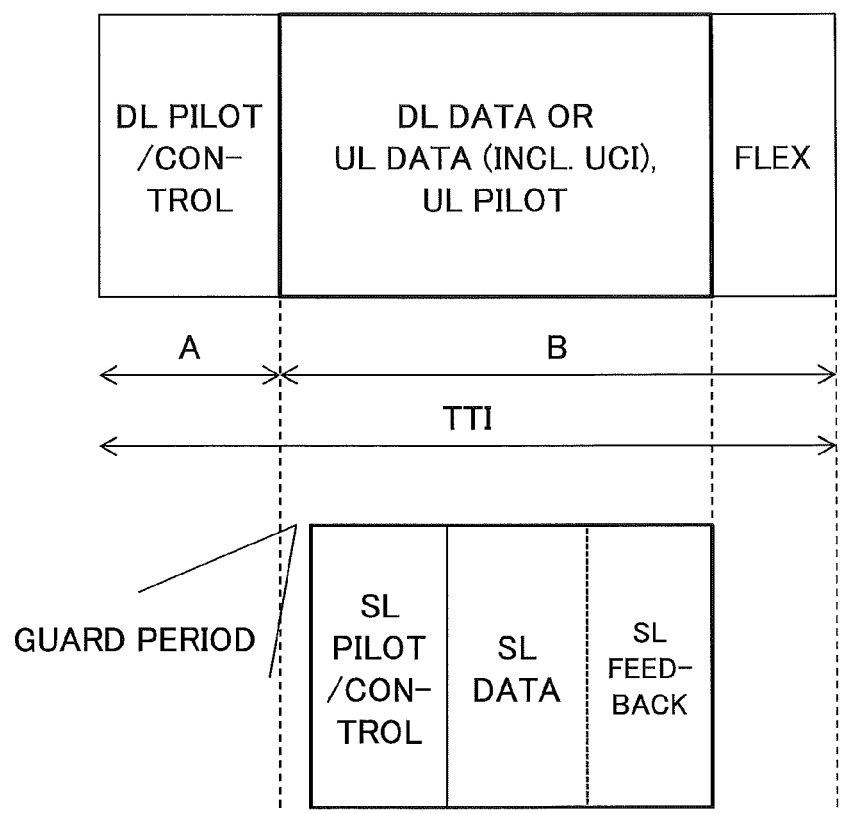
FIG. 5B is a diagram illustrating D2D physical channel configuration (1-3) according to the embodiment.

FIGS. 5A and 5B are diagrams illustrating D2D physical channel configuration (1-3) in the embodiment. As illustrated in FIGS. 5A and 5B, in this embodiment, a physical channel configuration in which a D2D pilot signal channel and a D2D physical control channel are mapped on first-half symbols among symbols of the region obtained by excluding the multi-use region from Region "B" of the 5G physical channel configuration and a D2D physical data channel is mapped on second-half symbols may be used. Similarly to FIGS. 3A, 3B, and 3C and FIGS. 4A and 4B, a feedback channel for feedback from the reception-side user equipment UEb to the transmission-side user equipment UEa may be additionally mapped on the second-half symbols.

FIG. 5A illustrates a D2D physical channel configuration when a feedback channel is not included and FIG. 5B illustrates a D2D physical channel configuration when a feedback channel is included.

(D2D Physical Channel Configuration (1-4))

Figure 6A:
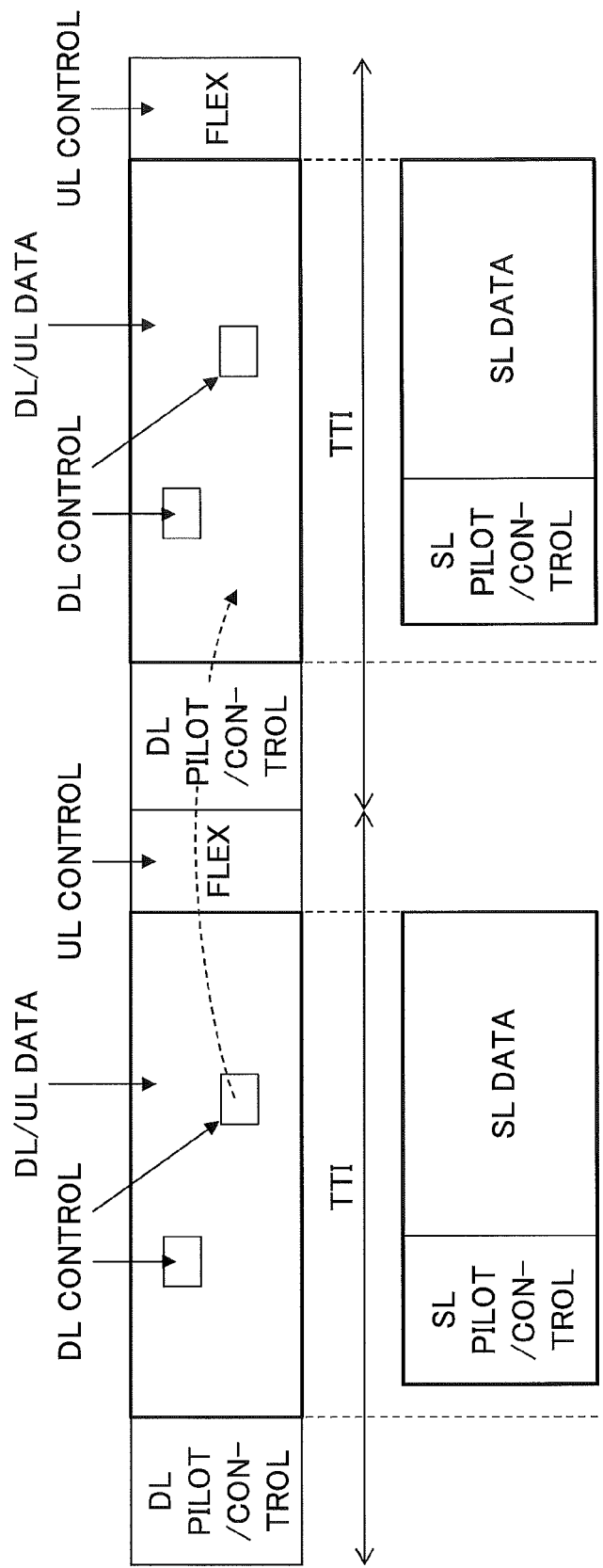
FIG. 6A is a diagram illustrating D2D physical channel configuration (1-4) according to the embodiment.

FIGS. 6A and 6B are diagrams illustrating D2D physical channel configuration (1-4) in the embodiment. As illustrated in FIGS. 6A and 6B, it is also assumed in 5G that a downlink control signal is transmitted using Region "B" like an enhanced physical downlink control channel (EPDCCH) in the conventional LTE.

In this embodiment, when a downlink control signal is transmitted using Region "B," a D2D physical channel configuration in which a D2D pilot signal channel and a D2D physical control channel are mapped on first-half symbols in whole Region "B" or the region obtained by excluding the multi-use region from Region "B" and a D2D physical data channel is mapped on second-half symbols may also be used as in D2D physical channel configurations (1-1) to (1-3).

FIG. 6A illustrates a D2D physical channel configuration when the D2D pilot signal channel and the D2D physical control channel are mapped on the first-half symbols in the region obtained by excluding the multi-use region from Region "B." FIG. 6B illustrates a D2D physical channel configuration when the D2D pilot signal channel and the D2D physical control channel are mapped on the first-half symbols among the symbols corresponding to Region "B" and the D2D physical data channel is mapped on the second-half symbols.

(D2D Physical Channel Configuration (1-5))

FIG. 7 is a diagram illustrating D2D physical channel configuration (1-5) in the embodiment. In this embodiment, instead of mapping the D2D pilot signal channel, the D2D physical control channel, and the D2D physical data channel on one subframe, the D2D pilot signal channel, the D2D physical control channel, and the D2D physical data channel may be mapped using a plurality of subframes. In the example illustrated in FIG. 7, the D2D pilot signal channel and the D2D physical control channel are mapped on first two subframes and the D2D physical data channel is mapped on second-half of four subframes.

In D2D physical channel configuration (1-5), one media access control protocol data unit (MAC PDU) may be divided and mapped on a plurality of subframes. Since it is difficult to transmit a D2D signal in a broadband in consideration of the maximum transmission power and the coverage of the user equipment UE, an amount of data which can be transmitted by one subframe is limited. Accordingly, by transmitting one MAC PDU by a plurality of subframes using D2D physical channel configuration (1-5), it is possible to secure the coverage and to transmit a MAC PDU having a large data size.

When D2D physical channel configuration (1-5) is applied, all of a plurality of subframes to which the D2D physical control channel is mapped may be considered as a physical side link control channel (PSCCH) resource pool in the convention LTE, all of a plurality of subframes to which the D2D physical data channel is mapped may be considered as a physical side link shared channel (PSSCH) resource pool, and the D2D control signal and the D2D data may be time-hopped and frequency-hopped and repeatedly transmitted in the resource pools similarly to the conventional D2D. Accordingly, when D2D physical channel configuration (1-5) is applied, it is possible to divert the conventional D2D interface (corresponding to Rel-12) and to reduce a processing load of the user equipment UE.

Allocation of the number of subframes to which the D2D physical control channel is mapped and the number of subframes to which the D2D physical data channel is mapped may be fixed or may be dynamically selected by determination of the transmission-side user equipment UEa.

A plurality of examples of the configuration of D2D physical channel configuration (1) have been described above. By using D2D physical channel configurations (1-1) to (1-4), it is possible to transmit a D2D control signal and D2D data in one TTI and to realize D2D communication with a delay lower than that in the conventional LTE. When D2D physical channel configuration (1-5) is used, it is possible to realize D2D communication with a delay lower than that in the conventional LTE by mapping the D2D physical control channel and the D2D physical data channel on subframes with a cycle (for example, less than 40 ms) shorter than that in the conventional LTE.

(Determination of Whether D2D Radio Resource is Available)

As described above, it is assumed that D2D physical channel configuration (1) is mainly used when an operation of overlapping 5G radio resources and D2D radio resources. Therefore, in this embodiment, the user equipment UE considers radio resources, which are not allocated as the 5G radio resources in the range set as a D2D resource pool among all radio resources allocated for 5G, as D2D radio resources and transmits and receives a D2D signal. The D2D resource pool may be broadcasted to the user equipment UE using broadcast information as in the convention LTE or may be defined in advance.

Figure 8:
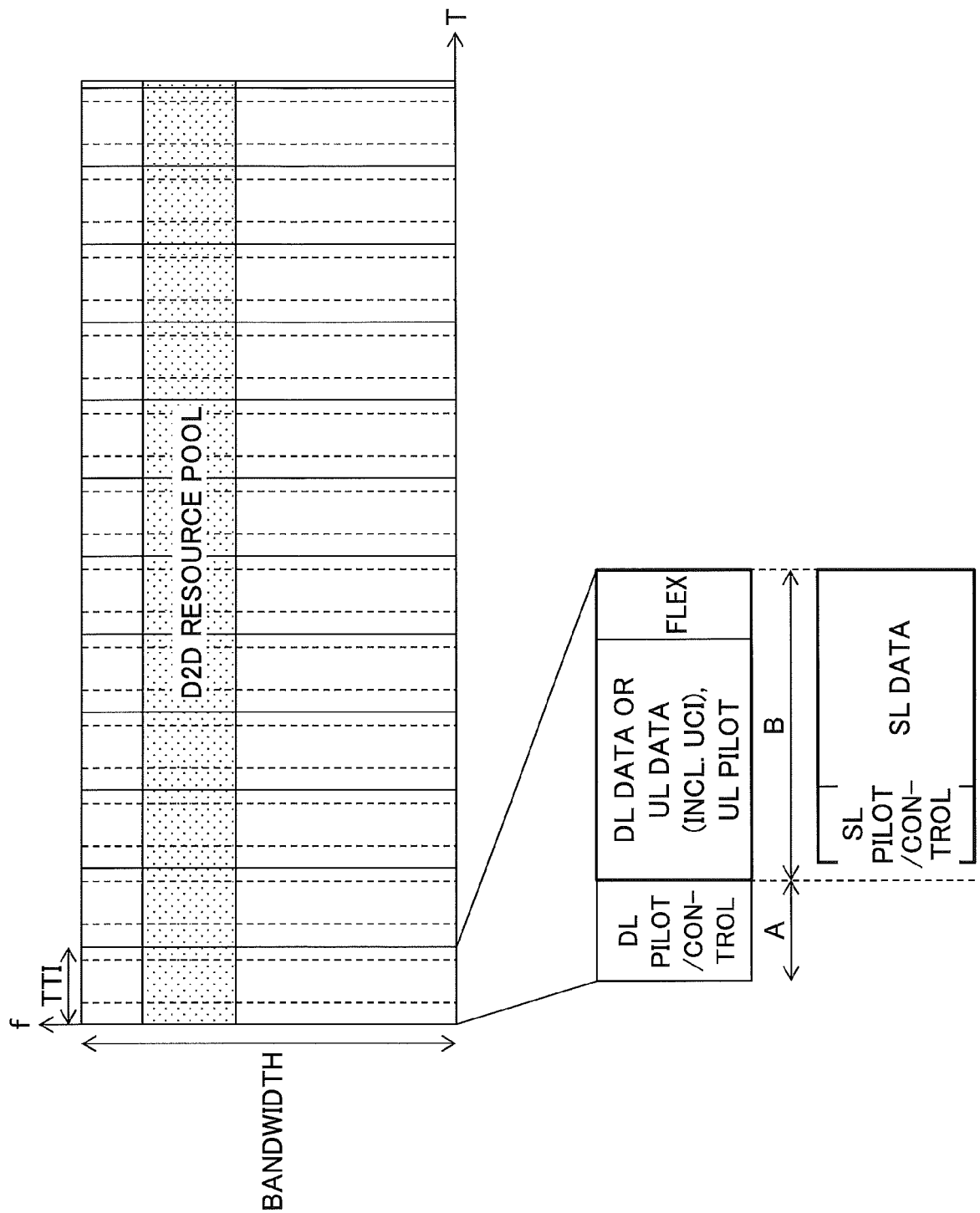
FIG. 8 is a diagram illustrating a relationship between a D2D resource pool and a D2D physical channel configuration.

FIG. 8 is a diagram illustrating a relationship between the D2D resource pool and the D2D physical channel configuration. As illustrated in FIG. 8, the D2D resource pool is set to a specific range among all the radio resources. A D2D physical channel is mapped on a part other than Region "A" in the D2D resource pool. The range of the D2D resource pool in FIG. 8 is an example. The D2D resource pool in this embodiment may be set to a certain range among all the radio resources or may be set to be periodically repeated.

A specific processing sequence which is performed by the user equipment UE will be described below. The user equipment UE determines whether 5G radio resources are allocated to a whole or a part of Region "B" (that is, whether a whole or a part of Region "B" is allocated to transmission of DL data and transmission of UL data) by monitoring Region "A" of the 5G physical channel configuration for each subframe in the D2D resource pool, and considers a whole or a part of Region "B" as the D2D radio resources when 5G radio resources are not allocated to a whole or a part of Region "B."

For example, the user equipment UE may determine whether 5G radio resources are allocated to a whole or a part of Region "B" by monitoring a specific radio resource (a search space) of Region "A."

In this case, the base station eNB maps an identifier indicating whether a whole or a part of Region "B" is allocated to 5G radio resources on the specific search space such that the user equipment UE can easily ascertain the identifier. The base station eNB may enable the user equipment UE to easily ascertain an identifier by mapping the identifier indicating that a whole or a part of Region "B" is D2D radio resources on the specific search space. The identifier may be broadcasted using another subframe (for example, a previous subframe or a subframe previous by several subframes). By broadcasting the identifier using another subframe in advance, it is possible to avoid an influence of a processing delay which may occur in the user equipment UE. The specific resource (the search space) may be quasi-statically broadcasted to the user equipment UE using broadcast information or the like in advance. The base station eNB may transmit an identifier indicating that all of predetermined subframes are D2D radio resources using another subframe (for example, a previous subframe or a subframe previous by several subframes). In the predetermined subframes, the user equipment UE can consider all the subframes including Region "A" and Region "B" as the D2D radio resources.

For example, the user equipment UE may determine whether 5G radio resources are allocated to a whole or a part of Region "B" by monitoring control signals dedicated for user equipment UE included in Region "A" for each subframe (that is, by monitoring Region "A" in a whole band).

In this case, the base station eNB may not mask control signals included in Region "A" with a cyclic redundancy check (CRC) using a user equipment ID (UEID) to enable the user equipment UE monitoring Region "A" to receive the control signals dedicated for other user equipments UE.

For example, the user equipment UE may determine whether 5G radio resources are allocated to a whole or a part of Region "B" by determining whether reception power of a whole or a part of Region "A" is equal to or less than a predetermined threshold value. In order to prevent erroneous recognition due to measurement of reception power of a control signal other than the control signal indicating allocation of radio resources to Region "B" among the control signals transmitted in Region "A," transmission resources may be quasi-statically set to Region "A" for each control signal.

For example, the user equipment UE may determine whether Region "B" can be considered as D2D radio resources using explicit broadcasting (such as an RRC signal or broadcast information) from the base station eNB. For example, it may be determined that radio resources for a random access channel, radio resources for a synchronization signal, and radio resources for transmission of broadcast information which are set in the broadcast information cannot be used as the D2D radio resources.

For example, when a control signal transmitted in Region "A" indicates radio resources mapped on Region "B" in another subframe, the user equipment UE may determine whether Region "B" of another subframe is considered as D2D radio resources by monitoring Region "A."

Similarly to the transmission-side user equipment UEa, the reception-side user equipment UEb monitors Region "A" and determines whether 5G radio resources are allocated to a whole or a part of Region "B." When it is determined that 5G radio resources are not allocated to a whole or a part of Region "B," the reception-side user equipment UEb monitors (waits for) a D2D signal which may be transmitted in a whole or a part of Region "B." When it is determined that 5G radio resources are allocated to a whole of Region "B," the reception-side user equipment UEb may not monitor Region "B." Accordingly, it is possible to suppress consumption of a battery of the user equipment UE.

<D2D Physical Channel Configuration (2)>

D2D physical channel configuration (2) in this embodiment will be described below. It is assumed that D2D physical channel configuration (2) is mainly used to perform an operation in which it is not necessary to consider interference with 5G radio resources such as a carrier allocated as a carrier dedicated for D2D communication or a carrier (for example, a carrier to which dynamic TDD is not applied and in which a whole subframe is allowed to be used as D2D radio resources) in which all radio resources can be considered as D2D radio resources.

When D2D physical channel configuration (2) is applied, the user equipment UE can transmit a D2D signal without determining whether Region "A" may be considered as D2D radio resources by monitoring Region "A." In a carrier to which D2D physical channel configuration (2) is applied, all radio resources may be considered as a D2D resource pool or a partial range of all the radio resources may be set as the D2D resource pool. When a partial range of all radio resources is set as a D2D resource pool, the user equipment UE may transmit a D2D signal using D2D physical channel configuration (2) within the range set as the D2D resource pool.

FIGS. 9A and 9B are diagrams illustrating D2D physical channel configuration (2) in the embodiment. As illustrated in FIGS. 9A and 9B, in D2D physical channel configuration (2), a D2D pilot signal (SL pilot) channel and a D2D control signal (SL control) channel are mapped on first-half symbols in one TTI and a D2D data (SL data) channel is mapped on second-half symbols.

FIG. 9A illustrates an example of a physical channel configuration when the number of symbols per subframe (one TTI) is set to be the same as the number of symbols in Region "B" in the 5G physical channel configuration. By using the D2D physical channel configuration illustrated in FIG. 9A, the user equipment UE can perform a demodulation process common to D2D physical channel configuration (1) when performing a demodulation process of a D2D signal. That is, when an operation in which D2D physical channel configuration (1) and D2D physical channel configuration (2) are mixed is performed in a plurality of carriers, it is possible to reduce a processing load of the user equipment UE.

FIG. 9B illustrates an example of D2D physical channel configuration (2) when the number of symbols per subframe (one TTI) is set to be the same as the number of symbols in a subframe in a radio frame configuration which is used in 5G. By using D2D physical channel configuration (2) illustrated in FIG. 9B, it is possible to reduce a processing load of the user equipment UE when transmitting a D2D control signal. In order to notify the user equipment UE of a carrier to which D2D physical channel configuration (2) is applied, the base station eNB may notify the user equipment UE of carrier information indicating whether each of a plurality of carriers allocated in the radio communication system is a carrier in which a 5G radio resource and a D2D radio resource are overlaid or a carrier which is allocated to be dedicated for D2D communication (or a carrier in which all radio resources can be considered as D2D radio resources). The user equipment UE may select a D2D physical channel configuration which is used for the D2D communication on the basis of the acquired carrier information. Specifically, when the carrier for transmitting a D2D signal is a carrier in which a 5G radio resource and a D2D radio resource are overlaid, the user equipment UE transmits the D2D signal using D2D physical channel configuration (1). When the carrier for transmitting a D2D signal is a carrier which is allocated to be dedicated for D2D communication (or a carrier in which all radio resources can be considered as D2D radio resources), the user equipment UE transmits the D2D signal using D2D physical channel configuration (2).

D2D physical channel configuration (2) illustrated in FIG. 9B may be used for a carrier in which a 5G radio resource and a D2D radio resource are overlaid. In this case, for example, a region to which a D2D pilot signal channel and a D2D physical control channel are mapped and Region "A" of the 5G physical channel configuration may be multiplexed in a code division multiplexing (CDM) manner.

D2D physical channel configuration (2) which is used for D2D communication has been described above. By using D2D physical channel configuration (2), it is possible to transmit the D2D control signal and the D2D data for each TTI and to transmit and receive data with a delay lower than that in the conventional D2D.

<Modified Example of D2D Resource Pool>

In the conventional D2D (D2d of Rel-12), a resource pool is set in a unit of subframes. On the other hand, in D2D physical channel configuration (1) which is used in this embodiment, radio resources are allocated in a unit of symbols instead allocating a whole subframe to D2D radio resources. Therefore, in this embodiment, when a D2D resource pool is set, the resource pool may be set in a unit of symbols in addition to a unit of subframes. More specifically, by adding information indicating symbol positions in addition to information indicating a radio frame number and a subframe number to information on a resource pool which is notified of the user equipment UE using broadcast information or the like, a start point and an end point of a resource pool on the time axis may be indicated.

In this embodiment, it is assumed that orthogonal frequency-division multiplexing (OFDM) is applied to transmission of a D2D signal, and the D2D resource pool may be discontinuous on the frequency axis. Single carrier transmission (of multi-clusters) may be applied. In a resource pool in the conventional D2D (D2D of Rel-12), two clusters can be allocated on the frequency axis, but in this embodiment, a resource pool may be allocated to more clusters. A resource pool which is discontinuous on the frequency axis may be expressed by a bit map.

<<Frequency Multiplexing of 5G Radio Resources and D2D Radio Resources>>

In the "(Determination of Whether D2D Radio Resource is Available)," when 5G radio resources are not allocated to a whole or a part of Region "B," a whole or a part of Region "B" is considered as D2D radio resources.

When a part of Region "B" is considered as D2D radio resources, 5G radio resources and D2D radio resources are frequency-multiplexed in Region "B."

When 5G radio resources and D2D radio resources are frequency-multiplexed, it is preferable that the user equipment UE transmit a D2D signal not to interfere with 5G communication.

Figure 10A:
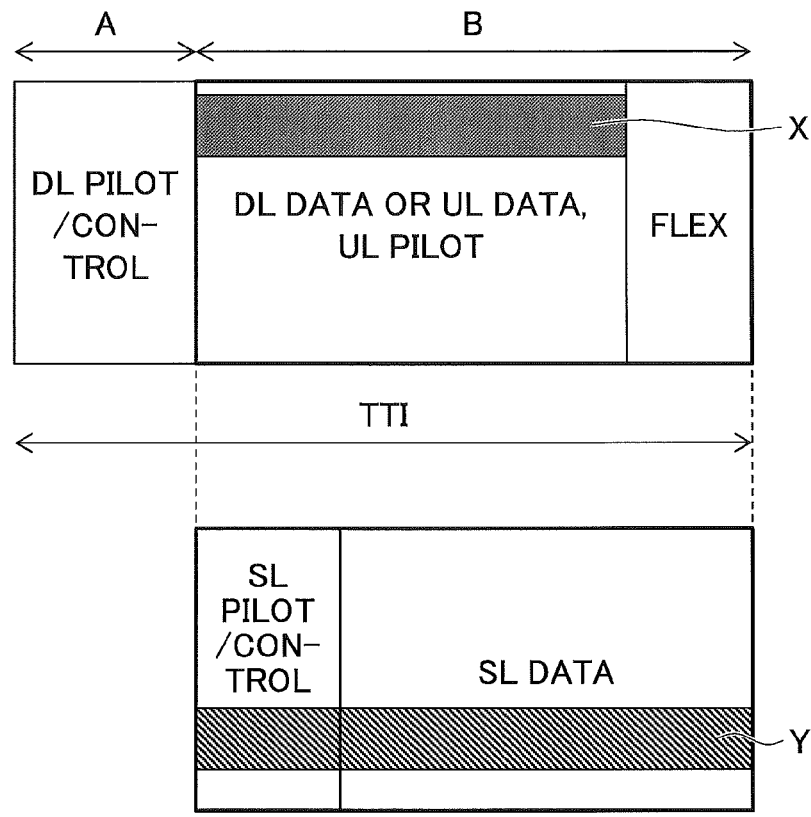
FIG. 10A is a diagram illustrating an example in which 5G radio resources and D2D radio resources are frequency-multiplexed.
Figure 10B:
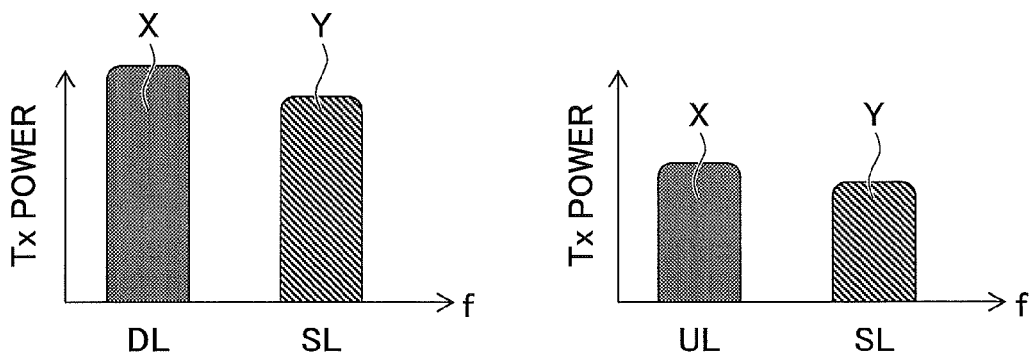
FIG. 10B is a diagram illustrating an example in which 5G radio resources and D2D radio resources are frequency-multiplexed.

FIGS. 10A and 10B are diagrams illustrating a case in which 5G radio resources and D2D radio resources are frequency-multiplexed. For example, as illustrated in FIG. 10A, it is assumed that 5G radio resources and D2D radio resources are frequency-multiplexed in Region "X" and Region "Y."

In this case, in order to suppress interference with 5G DL data (or UL data), the user equipment UE may provide a guard band in D2D radio resources and transmit a D2D signal. In this case, the user equipment UE may change a bandwidth of the guard band when Region "B" is allocated to transmission of DL data and when Region "B" is allocated to transmission of UL data. The user equipment UE may change (switch) the bandwidth of the guard band for each subframe.

When a D2D signal is transmitted, the user equipment UE may set transmission power of the D2D signal to be equal to or less than transmission power of DL data (or UL data), for example, as illustrated in FIG. 10B. In this case, the user equipment UE may determine the transmission power of the D2D signal by transmission power control (fractional TPC) based on a path loss acquired by measuring a downlink pilot signal in Region "A" and a power control command instructed from the base station eNB.

When Region "B" is allocated to transmission of DL data, the user equipment UE may control the transmission power of the D2D signal to be greater than that when Region "B" is allocated to transmission of UL data. Accordingly, when Region "B" is allocated to transmission of DL data, the reception-side user equipment UE can control the reception power of the D2D signal to be equal to or greater than a predetermined value.

The base station eNB may notify the user equipment UE of transmission power of a D2D signal in a unit of subframes using a downlink control signal transmitted in Region "A" and the user equipment UE may determine the transmission power of the D2D signal in accordance with the instruction.

The above-mentioned "(Determination of Whether D2D Radio Resource is Available)," the user equipment UE is enabled to consider a part of Region "B" as a D2D radio resource. In other words, the user equipment UE can take charge of determination of a radio resource range which is used to transmit a D2 signal. Therefore, when 5G radio resources and D2D radio resources are frequency-multiplexed, the base station eNB may explicitly (forcibly) notify the user equipment UE of a radio resource range in which a D2D signal can be transmitted using the downlink control signal which is transmitted in Region "A" for each frame. By causing the base station eNB to explicitly notify the user equipment UE of the radio resource range, it is possible to clearly separate a band used for 5G communication and a band used for D2D communication and to further suppress interference with 5G.

The base station eNB may notify whether a multi-use region (Flex) is included in the radio resource range in which a D2D signal can be transmitted together when notifying the radio resource in which a D2D signal can be transmitted. The downlink control signal may be mapped on a specific resource (a search space) in Region "A." The specific resource may be quasi-statically notified to the user equipment UE using broadcast information or the like in advance.

Figure 11A:
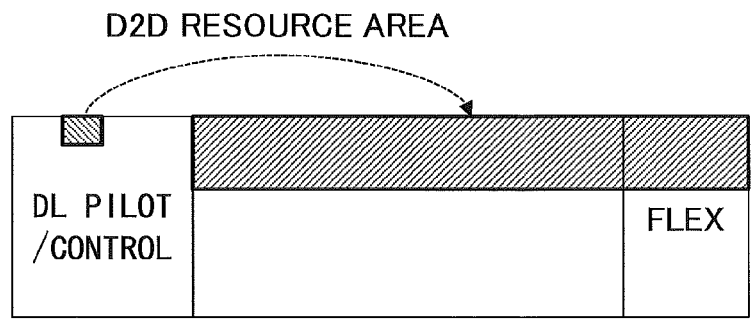
FIG. 11A is a diagram illustrating a method of instructing radio resources capable of transmitting a D2D signal.
Figure 11B:
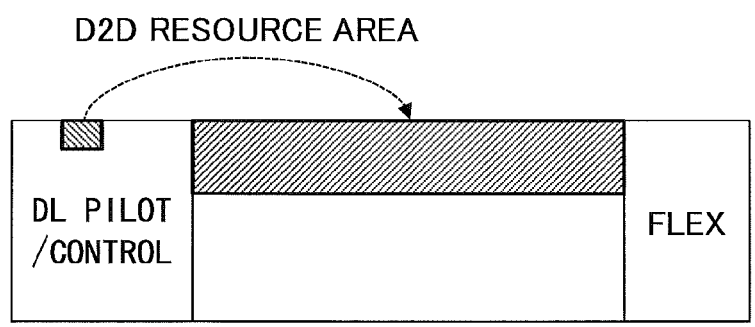
FIG. 11B is a diagram illustrating a method of instructing radio resources capable of transmitting a D2D signal.
Figure 11C:
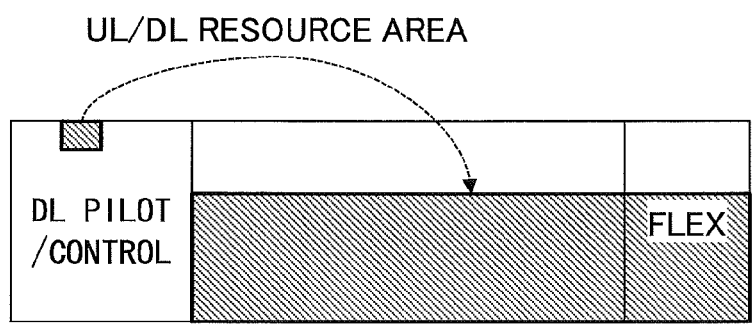
FIG. 11C is a diagram illustrating a method of instructing radio resources capable of transmitting a D2D signal.

FIGS. 11A, 11B, and 11C are diagrams illustrating a method of notifying radio resources in which a D2D signal can be transmitted. The base station eNB may notify the user equipment UE of "a radio resource region in which a D2D signal can be transmitted" including a multi-use region (Flex) for each subframe using a downlink control signal transmitted in Region "A" as illustrated in FIG. 11A, or may notify the user equipment UE of "a radio resource region in which a D2D signal can be transmitted" not including a multi-use region (Flex) for each subframe as illustrated in FIG. 11B.

The base station eNB may notify the user equipment UE of a range of radio resources which are allocated to DL data (or UL data) for each subframe using the downlink control signal transmitted in Region "A" as illustrated in FIG. 11C. In this case, the user equipment UE can determine that the radio resources in the range which is not allocated to DL data (or UL data) are radio resources in which can be transmitted a D2D signal.

The base station eNB may notify a range of radio resources in granularity of symbols when notifying the range of radio resources in which a D2D signal can be transmitted. As described above, when Region "B" is used to transmit UL data, an uplink pilot signal may be mapped on the head of Region "B." By performing notification in granularity of symbols, the base station eNB can notify the user equipment UE of the range of radio resources in which a D2D signal can be transmitted to avoid a range to which an uplink pilot signal is mapped. In this case, the user equipment UE may consider a difference in the number of symbols which can be used to transmit a D2D signal based on details of the downlink control signal and may transmit the D2D signal using a symbol which can be used in common to transmit the D2D signal. For example, when the number of symbols which can be used to transmit a D2D signal differs when an uplink pilot signal is mapped and when an uplink pilot signal is not mapped, the D2D signal is always transmitted with a configuration of a smaller number of symbols. In another method, the D2D signal may be transmitted using a configuration of a maximum number of symbols and symbols which cannot be used to transmit a D2D signal may be punctured. For example, the user equipment UE transmits the D2D signal using symbols which can be used to transmit the D2D signal when the pilot signal is not mapped, and performs puncture and transmits the D2D signal when an uplink pilot signal is mapped.

<<Half-Duplex Communication Countermeasure>>

D2D employs half-duplex communication using a common frequency band between the transmission-side user equipment UEa and the reception-side user equipment UEb. Accordingly, a user equipment UE which is transmitting a D2D signal cannot receive a D2D signal transmitted from another user equipment UE. In the case of D2D, since a partner user equipment UE to which data is transmitted cannot be said to be always in a standby state, it is necessary to cause the reception-side user equipment UE to easily receive the D2D signal as much as possible in order to achieve a decrease in delay in the D2D communication.

Therefore, a user equipment UE in this embodiment, may transmit a D2D signal after ascertaining that another user equipment UE does not transmit a D2D signal (a D2D physical data channel is available). In another method, a user equipment UE in this embodiment may repeatedly transmit the same D2D signal. Hereinafter, a specific processing sequence thereof will be described.

<Ascertainment of Availability of D2D Radio Resource>

FIG. 12 is a diagram illustrating a method of transmitting a D2D signal after ascertaining availability of a D2D radio resource. A user equipment UE may ascertain whether a D2D radio resource is available by monitoring a radio resource region to which a D2D physical control channel is mapped when transmitting a D2D signal, and may transmit the D2D signal using a next subframe when it is determined that the D2D radio resource is available (that another user equipment UE does not transmit a D2D signal). The user equipment UE may perform ascertainment of whether a D2D radio resource is available on a plurality of continuous subframes, and may transmit the D2D signal using a next subframe when the D2D radio resources in the plurality of continuous subframes are available. In the example illustrated in FIG. 12, the user equipment UE performs ascertainment of whether a D2D radio resource is available on two continuous subframes, and transmits a D2D signal using a next subframe when it is determined that the D2D radio resources in the two continuous subframes are available.

A method of ascertaining whether a D2D radio resource is available will be more specifically described below. A user equipment UE may ascertain whether a D2D radio resource is available, for example, by performing carrier sensing in a radio resource region to which a D2D physical control channel is mapped. The carrier sensing is a process of determining whether a band in which a D2D signal is to be transmitted is available or under use. More specifically, the user equipment UE determines that the D2D radio resource is under use when a reception level of a signal received in the band to which the D2D physical control channel is mapped is higher than a predetermined threshold value, and determines that the D2D radio resource is available when the reception level of the received signal is equal to or lower than the predetermined threshold value.

The user equipment UE may detect a D2D control signal by monitoring the radio resource region to which the D2D physical control channel is mapped, and may ascertain whether the D2D radio resource is available by checking radio resource allocation information included in the D2D control signal.

When a D2D physical data channel (SL data) is divided into a plurality of sub-channels on the time axis and the frequency axis, the user equipment UE may ascertain whether the D2D radio resource is available for each sub-channel.

When it is determined that the D2D radio resource is available, the user equipment UE may transmit a D2D signal continuously (in a burst manner) using a plurality of subframes subsequent to a next subframe. For example, when it is ascertained that the D2D radio resources in five continuous subframes are available, the user equipment UE may continuously transmit a D2D signal using eight subframes subsequent to the five subframes. The eight subframes may be actually continuous frames or may be subframes in which only subframes considered as the D2D radio resource in the above-mentioned "(Determination of Whether D2D Radio Resource is Available)" are continuous. Accordingly, it is possible to enhance a possibility that a D2D signal will reach the other user equipment UE.

In the radio communication system according to this embodiment, the number of subframes which are used to ascertain whether a D2D radio resource is available may be set to differ depending on user equipments UE. The number of subframes may be individually set for each user equipment UE using an RRC signal or the like from the base station eNB.

Accordingly, an operation in which a certain user equipment UE transmits a D2D signal using a next subframe when it is ascertained that the D2D radio resource in three continuous subframes is available and another user equipment UE transmits a D2D signal using a next subframe when the D2D radio resource in five continuous subframes is available can be realized, and the timing at which each user equipment UE starts transmission of a D2D signal can be randomized.

<Repeated Transmission>

A user equipment UE may repeatedly transmit the same D2D signal when transmitting the D2D signal. When the same D2D signal is repeatedly transmitted, the D2D signal may be repeatedly transmitted using a subframe which is arbitrarily selected by the user equipment UE among subframes available for the D2D radio resource. The user equipment UE may repeatedly transmit a second or subsequent D2D signal using a radio resource of the same band as the radio resource in the frequency direction in the subframes which has been first used to transmit the D2D signal. The user equipment UE may repeatedly transmit a D2D signal on the basis of a predetermined time/frequency hopping pattern.

(Repetition Window)

In this embodiment, a user equipment UE transmits a D2D signal using a subframe which has been considered as a D2D radio resource in the above-mentioned "(Determination of Whether D2D Radio Resource is Available)." That is, when the user equipment UE intends to repeatedly transmit the same D2D signal but the number of radio resources (subframes) available as the D2D radio resource is small, there is a possibility that a long time will be required until a final D2D signal is transmitted after a first D2D signal is transmitted.

Therefore, in this embodiment, a repetition window indicating a range in which the same D2D signal is repeatedly transmitted may be provided in advance and the user equipment UE may repeatedly transmit the same D2D signal (the same D2D control signal or/and the same D2D data) within only the repetition window. The length of the repetition window is not particularly limited, but a start point and an end point of a repetition window are quasi-statically set in the same way as the D2D resource pool.

Figure 13:
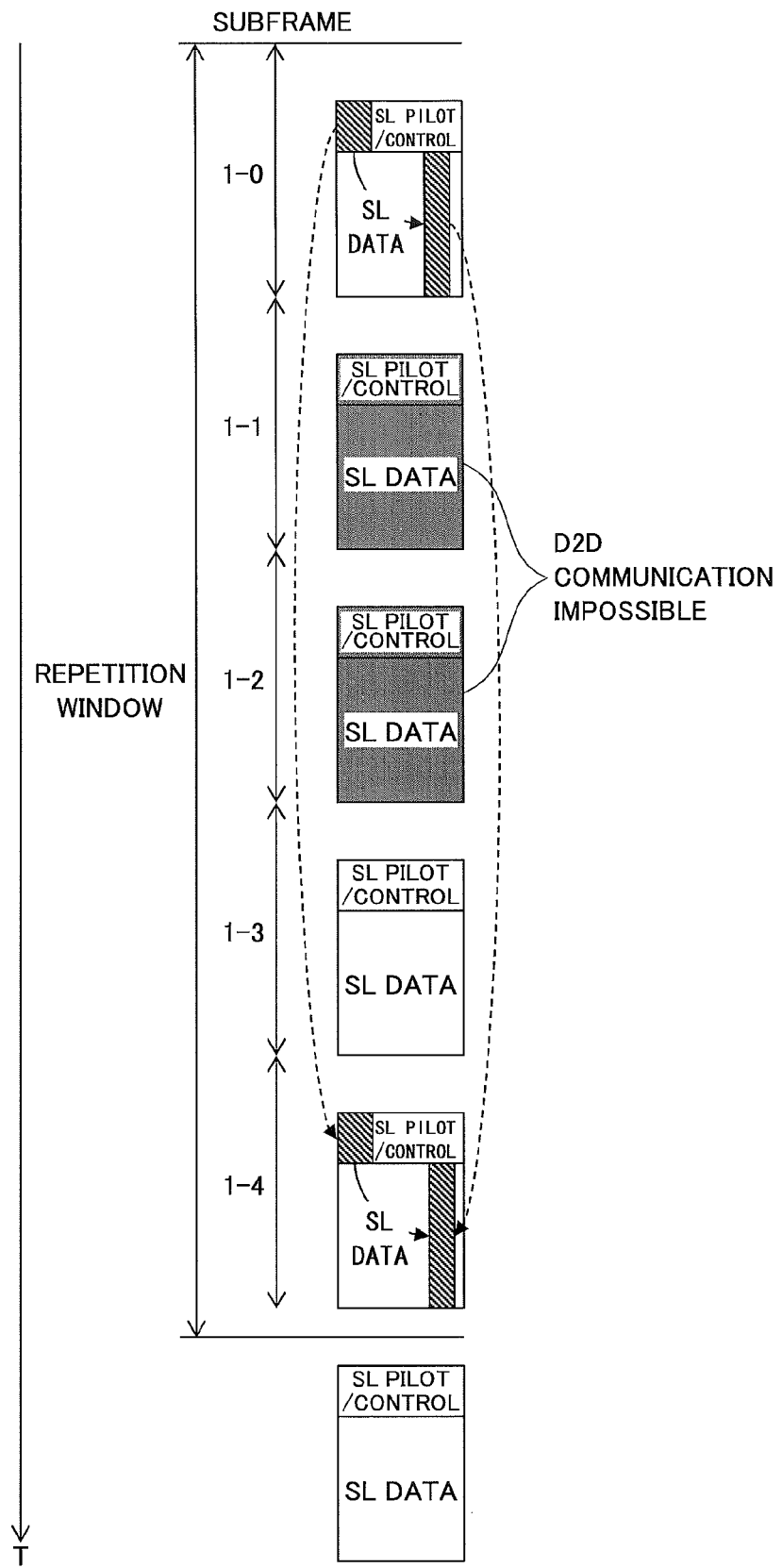
FIG. 13 is a diagram illustrating a method of repeatedly transmitting a D2D signal.

FIG. 13 is a diagram illustrating a method of repeatedly transmitting a D2D signal. In the example illustrated in FIG. 13, subframes 1-0 to 1-4 are set as a repetition window, and subframes 1-1 and 1-2 are subframes which are not available for D2D communication (for example, allocated for 5G radio resources). In this case, the user equipment UE can transmit the same D2D signal using subframes 1-0, 1-3, and 1-4. That is, the user equipment UE may repeatedly transmit the D2D signal using a subframe which is arbitrarily selected among subframes 1-0, 1-3, and 1-4, or may repeatedly transmit the D2D signal using a subframe corresponding to a predetermined time/frequency hopping pattern among subframes 1-0, 1-3, and 1-4. In the example illustrated in FIG. 13, the user equipment UE repeatedly transmits the same D2D signal using subframe 1-0 and subframe 1-4.

A start point and an end point of a repetition window may be explicitly set in a user equipment UE using broadcast information, an RRC signal, or the like from the base station eNB by designating a radio frame number, a subframe number, and a cycle.

A position of a reference subframe (a subframe position specified by a radio frame number and a subframe number) corresponding to a start point of a repetition window and a time/frequency hopping pattern (for example, which is repeatedly transmitted three times every other subframe) may be notified to a user equipment UE using broadcast information, an RRC signal, or the like from the base station eNB, and the user equipment UE may recognize that subframes from the reference subframe to the final subframe satisfying the time/frequency hopping pattern are a repetition window.

A transmission-side user equipment UE may include information indicating the start point and the end point of a repetition window in a D2D control signal and may repeatedly transmit the D2D signal. A reception-side user equipment UE receiving the D2D signal can recognize the end point of the repetition window with reference to the information.

(Time/Frequency Hopping Pattern)

As described above, when a D2D signal is repeatedly transmitted, a user equipment UE may repeatedly transmit the D2D signal on the basis of a predetermined time/frequency hopping pattern.

Figure 14:
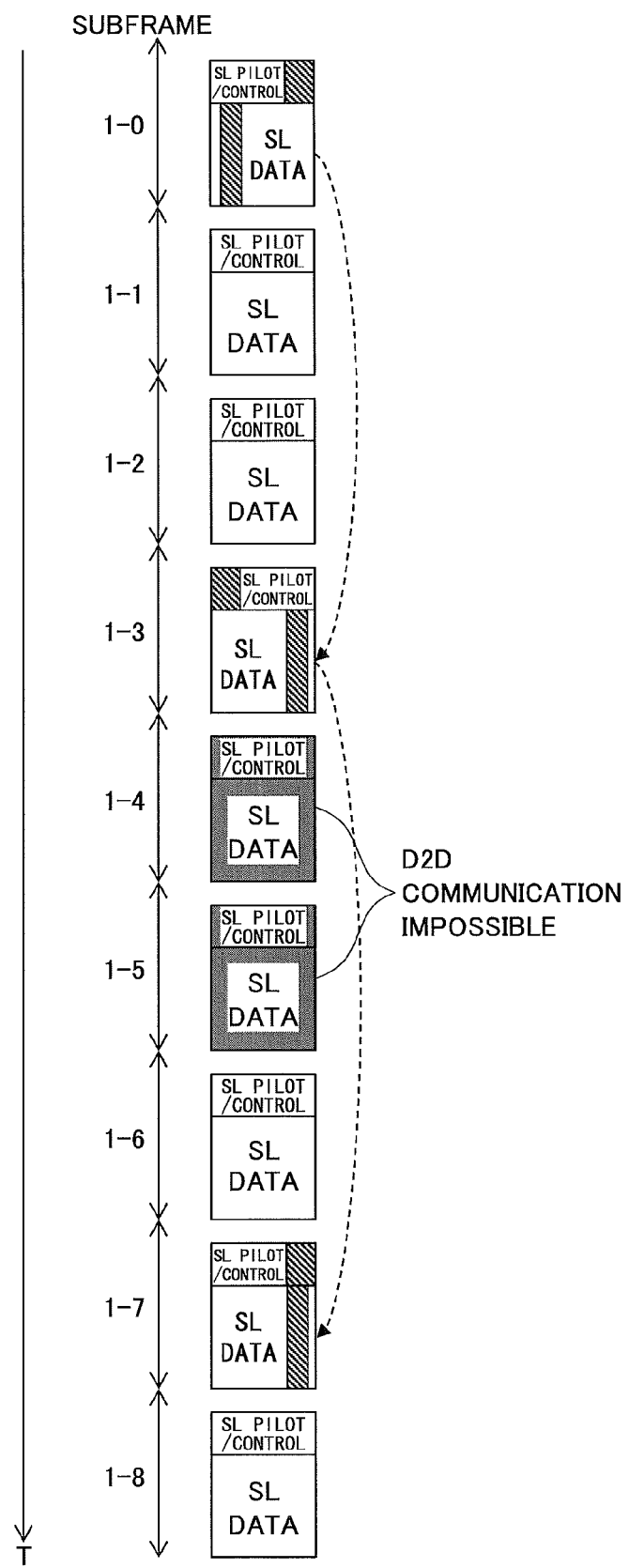
FIG. 14 is a diagram illustrating a method of repeatedly transmitting a D2D signal.

FIG. 14 is a diagram illustrating a method of repeatedly transmitting a D2D signal. For example, as illustrated in FIG. 14, a user equipment UE may repeatedly transmit a D2D signal on the basis of a predetermined time/frequency hopping pattern. In the example illustrated in FIG. 14, a state in which the same D2D signal is time/frequency-hopped and repeatedly transmitted using subframes 1-0, 1-3, and 1-7 is illustrated.

In this embodiment, a time/frequency hopping pattern may be shared by a transmission-side user equipment UEa and a reception-side user equipment UEb and the reception-side user equipment UEb may synthetically receive a plurality of D2D signals which are repeatedly transmitted. Accordingly, the reception-side user equipment UEb can enhance demodulation accuracy of the D2D signal.

For example, in this embodiment, a time/frequency hopping pattern may be prescribed for all subframes in a D2D resource pool regardless of whether each subframe is a D2D radio resource, and may be notified to a transmission-side user equipment UEa and a reception-side user equipment UEb using broadcast information, an RRC signal, or the like from the base station eNB.

In this case, the transmission-side user equipment UEa additionally ascertains whether the subframe is a subframe corresponding to the time/frequency hopping pattern notified in advance when a D2D signal is transmitted and it is determined in the above-mentioned "(Determination of Whether D2D Radio Resource is Available)" that a subframe can be used to transmit the D2D signal, and repeatedly transmits the D2D signal when the subframe is a subframe corresponding to the time/frequency hopping pattern. In this case, the user equipment UE does not transmit the D2D signal using the subframe which is a subframe corresponding to the time/frequency hopping pattern but cannot be used to transmit the D2D signal.

The reception-side user equipment UEb monitors the D2D signal on the basis of the previously notified time/frequency hopping pattern, considers that the D2D signals received on the basis of the time/frequency hopping pattern are the same D2D signal, and tries synthetic reception. By prescribing the time/frequency hopping pattern for all subframes in the D2D resource pool in advance, the reception-side user equipment UEb can correctly recognize whether received D2D signals are the same D2D signal even when a subframe considered as a D2D radio resource is erroneously recognized.

The time/frequency hopping pattern prescribed for all subframes in the D2D resource pool may be defined as a plurality of patterns. In this case, in order to enable the reception-side user equipment UEb to ascertain which time/frequency hopping pattern is applied, the transmission-side user equipment UEa may include information indicating the applied time/frequency hopping pattern in the D2D control signal.

For example, in this embodiment, the start point of the time/frequency hopping pattern and the start point of the repetition window may be prescribed to be equal to each other and the time/frequency hopping pattern and the repetition window may be notified in advance to the transmission-side user equipment UEa and the reception-side user equipment UEb using broadcast information, an RRC signal, or the like from the base station eNB. Since the time/frequency hopping pattern is fixedly set regardless of whether each subframe is used as a D2D radio resource, the reception-side user equipment UEb can correctly recognize whether the received D2D signals are the same D2D signal even when a subframe considered as a D2D radio resource is erroneously recognized.

In another example, the start point of the time/frequency hopping pattern may be arbitrarily determined by the transmission-side user equipment UEa, and the transmission-side user equipment UEa may include information indicating the applied time/frequency hopping pattern in the D2D control signal. When the D2D control signal can be received, the reception-side user equipment UEb can determine radio resources to which the D2D signal, which is repeatedly transmitted thereafter, is mapped.

Regarding the time/frequency hopping pattern, different time/frequency hopping patterns may be prescribed for the D2D control signal and the D2D data.

Instead of repeatedly transmitting the same D2D control signal and the same D2D data for each subframe, the D2D control signal may be first repeatedly transmitted and the D2D data may be repeatedly transmitted after the repeated transmission of the D2D control signal is completed. It is possible to divert the time/frequency hopping pattern in the conventional D2D (Rel-12).

In this embodiment, in order to enable the reception-side user equipment UEb to recognize that the same D2D data is repeatedly transmitted, the transmission-side user equipment UEa may give an index indicating the same MAC PDU to a MAC header or the like. Accordingly, the reception-side user equipment UEb receiving a plurality of pieces of D2D data can specify whether the received MAC PDU is a MAC PDU including repeated data or a MAC PDU including new data. As a result, even when the time/frequency hopping pattern is not shared in advance by the transmission-side user equipment UEa and the reception-side user equipment UEb, the reception-side user equipment UEb can recognize that the same D2D data has been received.

In this embodiment, When a message (ACK) indicating that a D2D signal can be correctly received from the reception-side user equipment UEb via a feedback channel, the transmission-side user equipment UEa may not repeatedly transmit the same D2D signal.

The method of allowing the reception-side user equipment UE to receive a D2D signal as easily as possible has been described above as a half-duplex communication countermeasure. The processing sequence described in "<Ascertainment of Availability of D2D Radio Resource>" and the processing sequence described in "<Repeated Transmission>" may be appropriately combined. For example, the processing sequence described in "<Ascertainment of Availability of D2D Radio Resource>" may be applied to transmission of a D2D control signal and the processing sequence described in "<Repeated Transmission>" may be applied to transmission of D2D data.

<Fail Safe>

In this embodiment, a user equipment UE transmits and receives a D2D signal using a subframe which is considered as a D2D radio resource in the above-mentioned "(Determination of Whether D2D Radio Resource is Available)."

However, when a 5G radio resource is allocated but a user equipment UE erroneously recognizes the 5G radio resource as a D2D radio resource, it is assumed that 5G communication is affected due to interference or the like.

Therefore, when a downlink control signal included in Region "A" is not detected at the time of monitoring Region "A," the use equipment UE may not consider the subframe as a D2D radio resource (that is, does not transmit the D2D signal using the subframe). The user equipment UE may not transmit the D2D signal within a range of a repetition window associated with the subframe or within a resource pool associated with the subframe in addition to the subframe. Accordingly, for example, it is possible to reduce a possibility that a user equipment UE present in an area having a bad communication condition will erroneously recognize a 5G radio resource as a D2D radio resource.

In another method, a base station eNB may allocate a D2D radio resource to a predetermined subframe and may continuously transmit a downlink control signal including information indicating a position of the D2D radio resource allocated to the predetermined subframe using a plurality of prescribed subframes (hereinafter referred to as a "downlink control information report window"). A user equipment UE may transmit a D2D signal using the predetermined subframe only when the information is not received within the plurality of prescribed subframes. The range of the downlink control information report window may be notified from the base station eNB to the user equipment UE in advance using broadcast information, an RRC signal, or the like. A specific example thereof will be described below with reference to the drawing.

Figure 15:
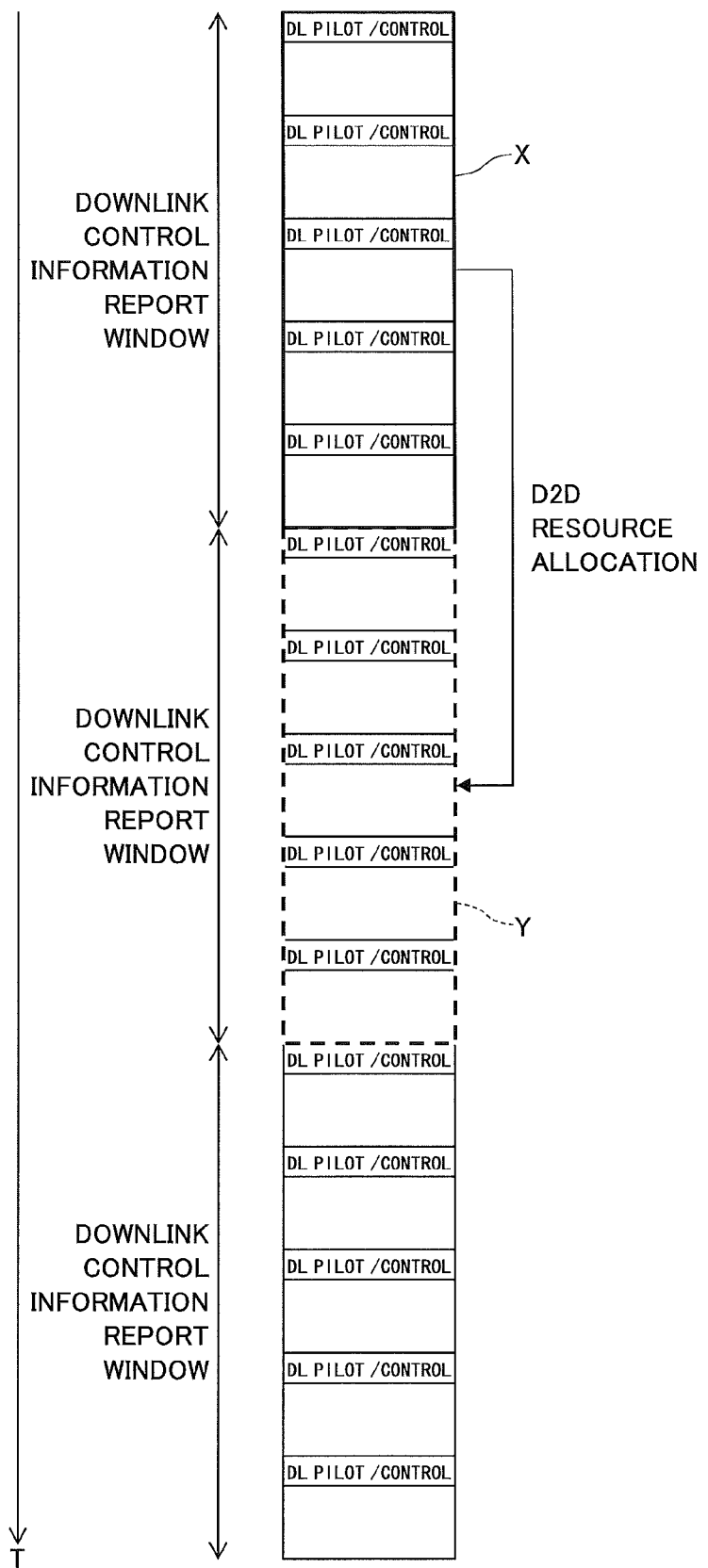
FIG. 15 is a diagram illustrating a method of enhancing a recognition rate of D2D radio resources.

FIG. 15 is a diagram illustrating a method of enhancing a recognition rate of a D2D radio resource. A base station eNB, for example, allocates D2D radio resources to five subframes ("Y" in FIG. 15) and continuously transmits a downlink control signal including information indicating positions of the D2D radio resources allocated to the five subframes using five subframes indicated by "X" in FIG. 15. A user equipment UE transmits a D2D signal using the radio resources (resource blocks at indicated positions) indicated by the information in the subframes ("Y" in FIG. 15) to which the D2D radio resources are allocated only when the information is received using one or more subframes of the five subframes indicated by "X" in FIG. 15.

Accordingly, for example, it is possible to reduce a possibility that a user equipment UE present in an area having a bad communication condition will erroneously recognize a 5G radio resource as a D2D radio resource and to reduce a possibility that a transmission opportunity of a D2D signal will be lost because a radio resource allocated for D2D is erroneously recognized as a 5G radio resource.

<<Functional Configuration>>

An example of functional configurations of a user equipment UE and a base station eNB that perform the operations of the above-mentioned embodiment will be described below.

<User Equipment>

Figure 16:
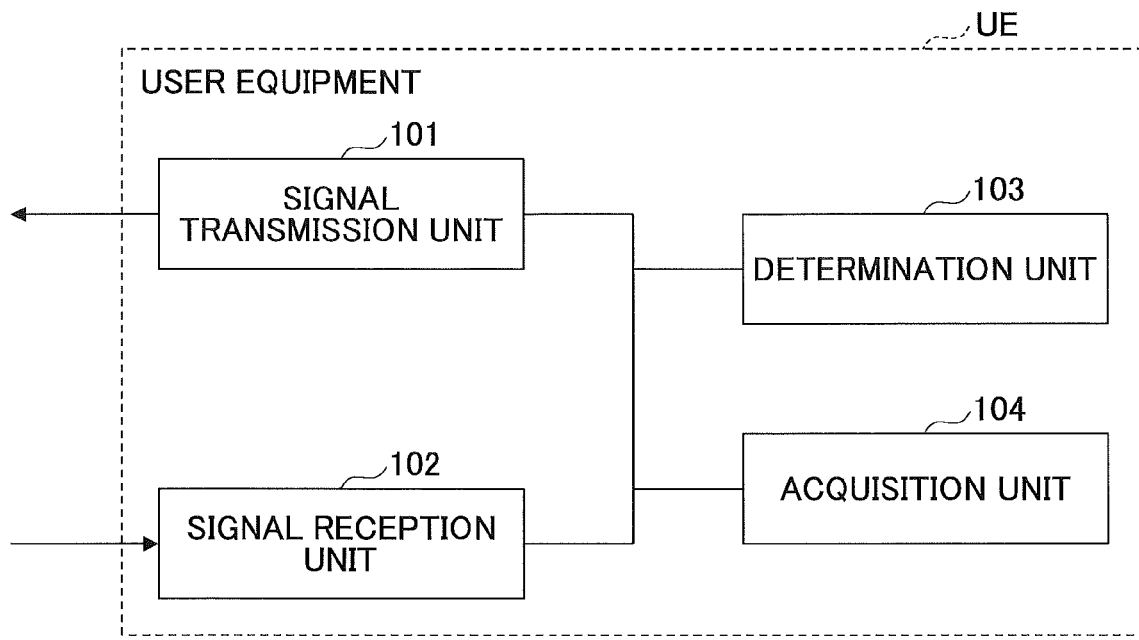
FIG. 16 is a diagram illustrating an example of a functional configuration of a user equipment according to the embodiment.

FIG. 16 is a diagram illustrating an example of a functional configuration of a user equipment according to the embodiment. As illustrated in FIG. 16, a user equipment UE includes a signal transmission unit 101, a signal reception unit 102, a determination unit 103, and an acquisition unit 104. FIG. 16 illustrates only functional units, which are particularly associated with the invention, in the user equipment UE and has functions, which are not illustrated, for performing at least LTE-based operations. The functional configuration illustrated in FIG. 16 is only an example. The functional subdivision and the names of the functional units are not particularly limited as long as the operations associated with the embodiment can be performed.

The signal transmission unit 101 has a function of generating various signals of a physical layer from a signal of an upper layer to be transmitted from the user equipment UE and wirelessly transmitting the generated signals. The signal transmission unit 101 has a D2D signal transmitting function and a cellular communication transmitting function. The signal transmission unit 101 has a function of transmitting a D2D signal on the basis of D2D physical channel configuration (1) or/and D2D physical channel configuration (2).

The signal transmission unit 101 has a function of transmitting a D2D signal on the basis of D2D physical channel configuration (1) using Region "B" in a radio frame including a region (Region "A") to which a downlink pilot signal and a downlink control signal are mapped and a region (Region "B") to which downlink user data or uplink data is mapped as a radio frame which is shared by downlink communication and uplink communication with a base station eNB in accordance with an instruction from the determination unit 103.

The signal transmission unit 101 has a function of transmitting a D2D signal using a radio frame in which a D2D physical control channel and a D2D physical data channel are time-multiplexed when the D2D signal is transmitted using a carrier which is used only for D2D communication. The number of symbols in the radio frame may be equal to the number of symbols in Region "B."

The signal transmission unit 101 may transmit a D2D signal with transmission power instructed from the base station eNB.

The signal transmission unit 101 may transmit a D2D signal using a frequency band which is not allocated to the uplink communication or downlink communication with the base station eNB in Region "B" in accordance with an instruction from the determination unit 103. The signal transmission unit 101 may transmit a D2D signal using the frequency band with transmission power instructed from the base station eNB.

The signal transmission unit 101 may transmit a D2D signal in Region "B" when the determination unit 103 continuously determines that the D2D signal can be transmitted a plurality of times.

The signal transmission unit 101 may repeatedly transmit a D2D signal on the basis of a predetermined hopping pattern. The signal transmission unit 101 may repeatedly transmit a D2D signal within a predetermined repetition window.

The signal reception unit 102 has a function of wirelessly receiving various signals from another user equipment UE or a base station eNB and acquiring a signal of an upper layer from the received signals of the physical layer. The signal reception unit 102 has a D2D signal receiving function and a cellular communication receiving function. The signal reception unit 102 has a function of receiving a D2D signal on the basis of D2D physical channel configuration (1) or/and D2D physical channel configuration (2).

The determination unit 103 has a function of determining whether a D2D signal can be transmitted in Region "B" by monitoring Region "A" in a radio frame including a region (Region "A") to which a downlink pilot signal and a downlink control signal are mapped and a region (Region "B") to which downlink user data or uplink data is mapped as a radio frame which is shared by downlink communication and uplink communication with a base station eNB.

The determination unit 103 may determine that a D2D signal can be transmitted in Region "B," when a control signal indicating that Region "B" is allocated to uplink communication or downlink communication between the base station eNB and the user equipment UE is not included in Region "A" or when reception power of Region "A" is equal to or less than a predetermined threshold value.

The determination unit 103 may determine that a D2D signal can be transmitted in Region "B," when information indicating that the D2D signal can be transmitted in a predetermined radio resource of Region "B" is included in a downlink control signal transmitted in Region "A." The determination unit 103 may instruct the signal transmission unit 101 to transmit the D2D signal using the predetermined radio resource indicated by the information.

The determination unit 103 may detect a frequency band in Region "B" which is not allocated to uplink communication or downlink communication between the base station eNB and the user equipment UE. When it is detected that only a predetermined frequency band in Region "B" is allocated to uplink communication or downlink communication between the base station eNB and the user equipment UE, the determination unit 103 may instruct the signal transmission unit 101 to transmit a D2D signal in a frequency band other than the predetermined frequency band.

The acquisition unit 104 has a function of acquiring carrier information indicating whether each of a plurality of carriers allocated in the radio communication system is a carrier which is used in common to communication between the base station eNB and the user equipment UE and D2D communication or a carrier which is used for only D2D communication using broadcast information, an RRC signal, or the like.

<Base Station>

Figure 17:
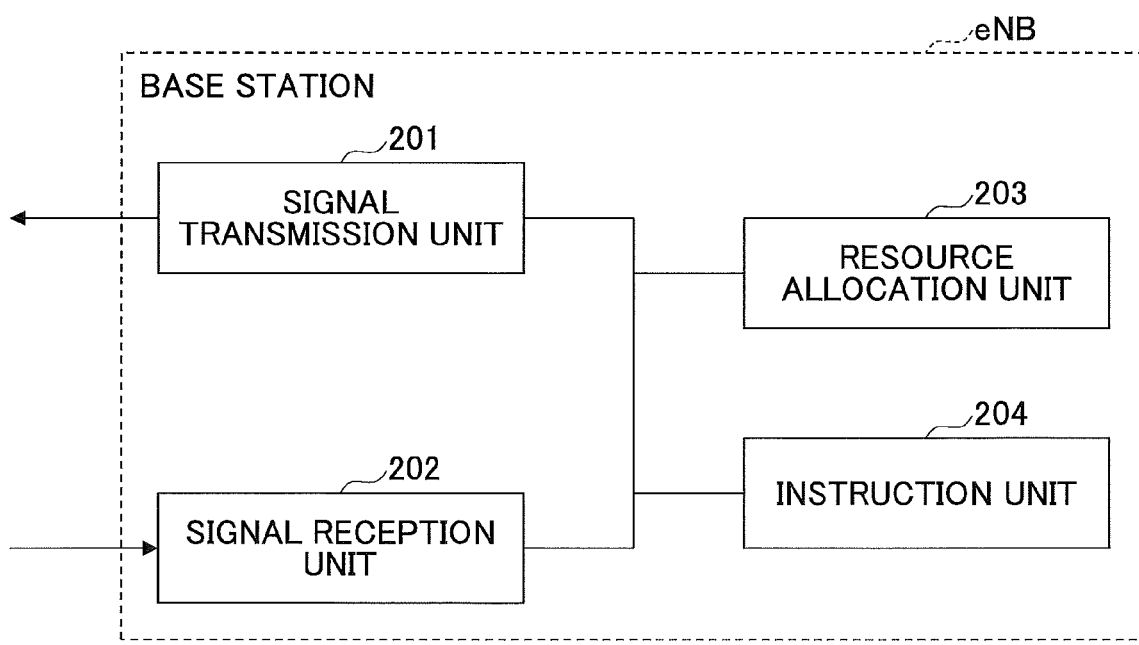
FIG. 17 is a diagram illustrating an example of a functional configuration of a base station according to the embodiment.

FIG. 17 is a diagram illustrating an example of a functional configuration of a base station according to the embodiment. As illustrated in FIG. 17, the base station eNB includes a signal transmission unit 201, a signal reception unit 202, a resource allocation unit 203, and an instruction unit 204. FIG. 17 illustrates only functional units, which are particularly associated with the embodiment of the invention, in the base station eNB and also has a function of performing at least LTE-based operations. The functional configuration illustrated in FIG. 17 is only an example. The functional subdivision and the names of the functional units are not particularly limited as long as the operations associated with the embodiment can be performed.

The signal transmission unit 201 has a function of generating various signals of a physical layer from a signal of an upper layer to be transmitted from the base station eNB and wirelessly transmitting the generated signals. The signal reception unit 202 has a function of wirelessly receiving various signals from the user equipment UE and acquiring a signal of an upper layer from the received signals of the physical layer.

The resource allocation unit 203 has a function of allocating 5G radio resources and D2D radio resources.

The instruction unit 204 has a function of instructing a variety of information associated with D2D communication to the user equipment UE. Examples of the variety of information include a power control command, information indicating a range of a repetition window, a time/frequency hopping pattern, information indicating a range of downlink control information report window, and carrier information.

<Hardware Configuration>

The block diagrams (FIGS. 16 and 17) which are used above to describe the embodiment illustrate blocks in units of functions. The functional blocks (constituent units) are embodied in any combination of hardware and/or software. Means for embodying the functional blocks is not particularly limited. That is, the functional blocks may be embodied by one unit which is physically and/or logically coupled or may be embodied by two or more units which are physically and/or logically separated and which are connected directly and/or indirectly (for example, in a wired and/or wireless manner).

Figure 18:
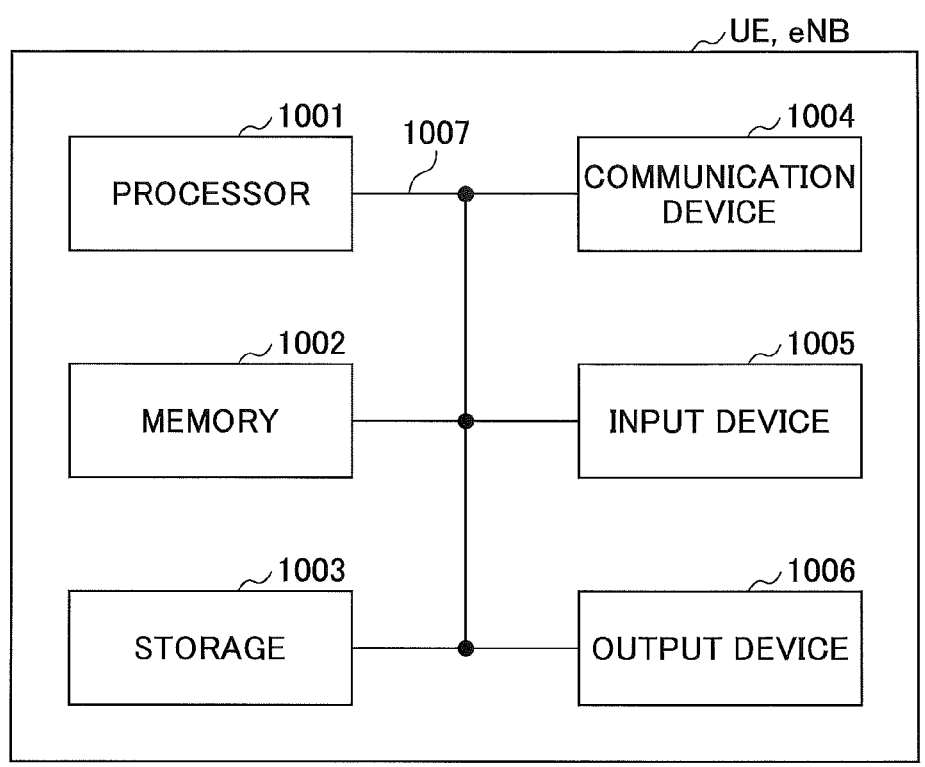
FIG. 18 is a diagram illustrating an example of a hardware configuration of a user equipment and a base station according to the embodiment.

For example, the user equipment UE and the base station eNB in the embodiment of the invention may function as computers that perform the processes of the communication method according to the invention. FIG. 18 is a diagram illustrating an example of a hardware configuration of the user equipment UE and the base station eNB according to the invention. The user equipment UE and the base station eNB described above may be physically configured as a computer device including a processor 1001, a memory 1002, a storage 1003, a communication device 1004, an input device 1005, an output device 1006, and a bus 1007.

In the following description, a word "unit" may be referred to as a circuit, a device, a unit, or the like. The hardware configurations of the user equipment UE and the base station eNB may include one or more units illustrated in the drawing or may not include some units.

The functions of the user equipment UE and the base station eNB are realized by causing hardware such as the processor 1001 and the memory 1002 to read predetermined software (a program) and causing the processor 1001 to perform computation and to control communication of the communication device 1004 and reading and/or writing of data in the memory 1002 and the storage 1003.

The processor 1001 controls the computer as a whole, for example, by activating an operating system. The processor 1001 may be constituted by a central processing unit (CPU) including an interface with peripherals, a control unit, a calculation unit, a register, and the like. For example, the signal transmission unit 101, the signal reception unit 102, the determination unit 103, and the acquisition unit 104 of the user equipment UE and the signal transmission unit 201, the signal reception unit 202, the resource allocation unit 203, and the instruction unit 204 of the base station eNB may be embodied by the processor 1001.

The processor 1001 reads a program (program codes), a software module, or data from the storage 1003 and/or the communication device 1004 to the memory 1002 and performs various processes in accordance therewith. As the program, a program causing a computer to perform at least a part of the operations described above in the embodiment is used. For example, the signal transmission unit 101, the signal reception unit 102, the determination unit 103, and the acquisition unit 104 of the user equipment UE and the signal transmission unit 201, the signal reception unit 202, the resource allocation unit 203, and the instruction unit 204 of the base station eNB may be embodied by a control program which is stored in the memory 1002 and operated by the processor 1001 or the other functional blocks may be similarly embodied. Various processes described above have been described to be performed by a single processor 1001, but may be simultaneously or sequentially performed by two or more processors 1001. The processor 1001 may be mounted as one or more chips. The program may be transmitted from a network via an electric communication line.

The memory 1002 is a computer-readable recording medium and may be constituted, for example, by at least one of a read only memory (ROM), an erasable programmable ROM (EPROM), an electrically erasable programmable ROM (EEPROM), and a random access memory (RAM). The memory 1002 may be referred to as a register, a cache, or a main memory (a main storage unit). The memory 1002 can store a program (program codes), a software module, or the like which can be executed to perform the communication method according to the embodiment of the invention.

The storage 1003 is a computer-readable recording medium and may be constituted, for example, by at least one of an optical disc such as a compact disc ROM (CD-ROM), a hard disk drive, a flexible disk, a magneto-optical disk (such as a compact disk, a digital versatile disk, or a Blu-ray (registered trademark) disk), a smart card, a flash memory (such as a card, a stick, or a key drive), a floppy (registered trademark) disk, and a magnetic strip. The storage 1003 may be referred to as an auxiliary storage unit. Examples of the recording medium may include a database including the memory 1002 and/or the storage 1003, a server, and another appropriate medium.

The communication device 1004 is hardware (a transceiver device) that allows communication between computers via a wired and/or wireless network and is referred to as, for example, a network device, a network controller, a network card, or a communication module. For example, the signal transmission unit 101 and the signal reception unit 102 of the user equipment UE and the signal transmission unit 201 and the signal reception unit 202 of the base station eNB may be embodied by the communication device 1004.

The input device 1005 is an input device (such as a keyboard, a mouse, a microphone, a switch, a button, or a sensor) that receives an input from the outside. The output device 1006 is an output device (such as a display, a speaker, or an LED lamp) that performs outputting to the outside. The input device 1005 and the output device 1006 may be configured as a unified body (such as a touch panel).

The units such as the processor 1001 and the memory 1002 are connected to each other via the bus 1007 for transmitting and receiving information. The bus 1007 may be constituted by a single bus or may be configured by different buses between the units.

The user equipment UE and the base station eNB may be configured to include hardware such as a microprocessor, a digital signal processor (DSP), an application specific integrated circuit (ASIC), a programmable logic device (PLD), or a field programmable gate array (FPGA), or a part or all of the functional blocks may be embodied by the hardware. For example, the processor 1001 may be mounted as at least one hardware module.

SUMMARY

According to the above-mentioned embodiment, there is provided a user equipment in a radio communication system that supports D2D communication. The user equipment includes a determination unit that receives a first region in a radio frame, which is commonly used for downlink communication and uplink communication with a base station and includes the first region to which a downlink pilot signal and a downlink control signal are to be mapped and a second region to which downlink user data or uplink data is to be mapped, to determine whether a D2D signal is transmittable using the second region; and a transmission unit that transmits the D2D signal using the second region in the radio frame where a D2D physical control channel and a D2D physical data channel are time-multiplexed when the determination unit determines that the D2D signal is transmittable. According to the user equipment UE, it is possible to provide a technology that enables D2D communication with a low delay.

The determination unit may determine that the D2D signal is transmittable using the second region when the first region does not include a control signal indicating that the second region is allocated to the uplink communication or the downlink communication with the base station or when reception power of the first region is less than or equal to a predetermined threshold value. Accordingly, it is possible to perform D2D communication, for example, using a radio resource to which no 5G radio resource is allocated. That is, it is possible to multiplex a 5G radio resource and a D2D communication radio resource.

The transmission unit may transmit the D2D signal using a frequency band other than a predetermined frequency band in the second region when only the predetermined frequency band is allocated to the uplink communication or the downlink communication with the base station. Accordingly, it is possible to frequency-multiplex 5G communication and D2D communication in the same band.

The transmission unit may transmit the D2D signal with transmission power specified by the base station using the frequency band other than the predetermined frequency band. Accordingly, when 5G communication and D2D communication are frequency-multiplexed in the same band, it is possible to suppress interference between the 5G communication and the D2D communication. Since the interference is suppressed, it is possible to improve communication quality.

The transmission unit may transmit the D2D signal using the second region when the determination unit determines multiple times in succession that the D2D signal is transmittable. Accordingly, it is possible to transmit a D2D signal at a timing where it is highly unlikely that another user equipment UE is transmitting a D2D signal and to avoid an influence of half-duplex communication as much as possible. It is also possible to increase the possibility that a D2D signal reaches a reception-side user equipment UE.

According to the above-mentioned embodiment, there is provided a user equipment in a radio communication system that supports D2D communication. The user equipment includes an acquisition unit that acquires carrier information indicating whether each of multiple carriers allocated to the radio communication system is used commonly for communication between a base station and the user equipment and D2D communication or used only for the D2D communication; and a transmission unit that when a D2D signal is to be transmitted using a carrier used only for the D2D communication, transmits the D2D signal using a radio frame where a D2D physical control channel and a D2D physical data channel are time-multiplexed. With this user equipment UE, it is possible to provide a technology that enables D2D communication with a low delay.

The number of symbols of the radio frame may be equal to the number of symbols corresponding to a region to which the downlink user data or the uplink data is mapped in a radio frame used in a carrier where communication between the base station and the user equipment is performed. Accordingly, when physical channel configuration (1) and physical channel configuration (2) are mixed in multiple carriers, it is possible to reduce the processing load of the user equipment UE.

The transmission unit may repeatedly transmit the D2D signal based on a predetermined hopping pattern. Accordingly, it is possible to avoid an influence of half-duplex communication as much as possible. It is also possible to enhance the possibility that a D2D signal reaches a reception-side user equipment UE.

According to the above-mentioned embodiment, there is provided a communication method performed by a user equipment in a radio communication system that supports D2D communication. The communication method includes receiving a first region in a radio frame, which is commonly used for downlink communication and uplink communication with a base station and includes the first region to which a downlink pilot signal and a downlink control signal are to be mapped and a second region to which downlink user data or uplink data is to be mapped, and thereby determining whether a D2D signal is transmittable using the second region; and transmitting the D2D signal using the second region in the radio frame where a D2D physical control channel and a D2D physical data channel are time-multiplexed when it is determined in the determining that the D2D signal is transmittable. According to the communication method, it is possible to provide a technology that enables D2D communication with a low delay.

According to the above-mentioned embodiment, there is provided a communication method performed by a user equipment in a radio communication system that supports D2D communication. The communication method includes acquiring carrier information indicating whether each of multiple carriers allocated to the radio communication system is used commonly for communication between a base station and the user equipment and D2D communication or used only for the D2D communication; and when a D2D signal is to be transmitted using a carrier used only for the D2D communication, transmitting the D2D signal using a radio frame where a D2D physical control channel and a D2D physical data channel are time-multiplexed. According to the communication method, it is possible to provide a technology that enables D2D communication with a low delay.

<Complement of Embodiment>

The D2D physical control channel may be a PSCCH. The D2D physical data channel may be a PSSCH. The D2D control signal may be side link control information (SCI). The control signal and the control information may be used in the same meaning.

The configuration of the devices (user equipment UE/base station eNB) described in the embodiment of the invention may have a configuration in which the devices include a CPU and a memory and which is embodied by causing the CPU (processor) to execute a program, may have a configuration which is embodied by hardware such as a hardware circuit having logics of the processing described in the embodiment, or may have a configuration in which a program and hardware are mixed.

While embodiments of the invention have been described above, the invention disclosed herein is not limited to the embodiments and it will be understood by those skilled in the art that various modifications, corrections, alternatives, substitutions, and the like can be made. While description has been made using specific numerical value examples for the purpose of promoting understanding of the invention, such numerical values are only simple examples and arbitrary appropriate values may be used unless otherwise specified. The sorting of items in the above description is not essential to the invention, details described in two or more items may be combined for use if necessary, or details described in a certain item may be applied to details described in another item (unless incompatible). Boundaries between functional units or processing units in the functional block diagrams cannot be said to be necessarily correspond to boundaries of physical components. Operations of a plurality of functional units may be physically performed by one component, or an operation of one functional unit may be physically performed by a plurality of components. The sequences and the flowcharts described above in the embodiment may be changed in the order as long as they are not incompatible with each other. For the purpose of convenience of explanation, while a user equipment UE and a base station eNB have been described above with reference to functional block diagrams, such devices may be embodied by hardware, by software, or by combination thereof. Software which is executed by a processor of the user equipment UE and software which is executed by a processor of the base station eNB in the embodiments of the invention may be stored in an appropriate storage medium such as a random access memory (RAM), a flash memory, a read only memory (ROM), an EPROM, an EEPROM, a register, a hard disk (HDD), a removable disk, a CD-ROM, a database, or a server.

In the embodiment, Region "A" is an example of the first region. Region "B" is an example of the second region.

EXPLANATION OF REFERENCE NUMERALS eNB base station
UE user equipment 101 signal transmission unit
102 signal reception unit
103 determination unit
104 acquisition unit
201 signal transmission unit
202 signal reception unit
203 resource allocation unit
204 instruction unit
1001 processor
1002 memory
1003 storage
1004 communication device
1005 input device
1006 output device

The invention claimed is:

1. A terminal, comprising:
a receiver configured to receive first sidelink control information (SCI) in a first physical sidelink control channel (PSCCH) from another terminal;
a processor configured to measure a reception level based on the first PSCCH and determine whether a radio resource for sidelink transmission is usable based on the reception level; and
a transmitter configured to transmit data via a physical sidelink shared channel (PSSCH) within the radio resource,
wherein the processor is configured to determine to not use the radio resource for transmission when the reception level of the first PSCCH is higher than a threshold.

2. The terminal as claimed in claim 1, wherein the transmitter is configured to transmit second SCI via a second PSCCH and transmit the data via the PSSCH using a radio resource that has not been determined by the processor to be not used for the sidelink transmission.

3. The terminal as claimed in claim 2, wherein
the receiver is configured to receive information on a symbol position in a resource pool;
the processor is configured to control the sidelink transmission in the resource pool based on symbols that are indicated by the information on the symbol position and are usable for the sidelink transmission in the radio resource constituting the resource pool; and
the transmitter is configured to transmit the data within the symbols.

4. The terminal as claimed in claim 2, wherein
the receiver is configured to receive, from a base station, information on a radio frame configuration between the base station and the terminal; and
the processor is configured to control the sidelink transmission based on the information on the radio frame configuration.

5. The terminal as claimed in claim 2, wherein the transmitter is configured to not transmit the data on the PSSCH when the receiver receives an ACK corresponding to the data on the PSSCH.

6. The terminal as claimed in claim 1, wherein
the receiver is configured to receive information on a symbol position in a resource pool;
the processor is configured to control the sidelink transmission in the resource pool based on symbols that are indicated by the information on the symbol position and are usable for the sidelink transmission in the radio resource constituting the resource pool; and
the transmitter is configured to transmit the data within the symbols.

7. The terminal as claimed in claim 6, wherein
the receiver is configured to receive, from a base station, information on a radio frame configuration between the base station and the terminal; and
the processor is configured to control the sidelink transmission based on the information on the radio frame configuration.

8. The terminal as claimed in claim 6, wherein the transmitter is configured to not transmit the data on the PSSCH when the receiver receives an ACK corresponding to the data on the PSSCH.

9. The terminal as claimed in claim 1, wherein
the receiver is configured to receive, from a base station, information on a radio frame configuration between the base station and the terminal; and
the processor is configured to control the sidelink transmission based on the information on the radio frame configuration.

10. The terminal as claimed in claim 9, wherein the transmitter is configured to not transmit the data on the PSSCH when the receiver receives an ACK corresponding to the data on the PSSCH.

11. The terminal as claimed in claim 1, wherein the transmitter is configured to not transmit the data on the PSSCH when the receiver receives an ACK corresponding to the data on the PSSCH.

12. The terminal as claimed in claim 11, wherein the processor is configured to control repeated transmission of the data on the PSSCH based on the ACK.

13. A radio communication system, comprising:
a base station and a terminal,
wherein the base station includes a first transmitter configured to transmit configuration information on inter-terminal direct communication to the terminal; and
the terminal includes:
a receiver configured to receive information on a symbol position in a resource pool included in the configuration information on the inter-terminal direct communication;
a processor configured to control sidelink transmission in the resource pool based on symbols that are indicated by the information on the symbol position and are usable for the sidelink transmission in the radio resource constituting the resource pool; and
a second transmitter configured to transmit data on a physical sidelink shared channel (PSSCH) within the symbols;
the receiver is configured to receive sidelink control information (SCI) in a physical sidelink control channel (PSCCH) from another terminal;
the processor is configured to measure a reception level based on the PSCCH and determine whether a radio resource for the sidelink transmission is usable based on the reception level; and
the processor is configured to determine to not use the radio resource for transmission when the reception level of the PSCCH is higher than a threshold.

14. A communication method performed by a terminal, the communication method comprising:
receiving sidelink control information (SCI) in a physical sidelink control channel (PSCCH) from another terminal;
measuring a reception level based on the PSCCH;
determining whether a radio resource for sidelink transmission is usable based on the reception level; and
transmitting data via a physical sidelink shared channel (PSSCH) within the radio resource, wherein the radio resource is determined to be not used for transmission when the reception level of the PSCCH is higher than a threshold.

* * * * *